(12) United States Patent
Inayethulla

(10) Patent No.: US 11,394,684 B1
(45) Date of Patent: Jul. 19, 2022

(54) ADDRESS DISCOVERY SYSTEM

(71) Applicant: Dell Products L.P., Round Rock, TX (US)

(72) Inventor: Syed Inayethulla, Davangere (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/345,661

(22) Filed: Jun. 11, 2021

(30) Foreign Application Priority Data

May 29, 2021 (IN) .............................. 202111023988

(51) Int. Cl.
| | | |
|---|---|---|
| *H04L 61/4541* | (2022.01) | |
| *H04L 61/2557* | (2022.01) | |
| *H04L 12/46* | (2006.01) | |
| *H04L 49/15* | (2022.01) | |

(52) U.S. Cl.
CPC ...... *H04L 61/1541* (2013.01); *H04L 12/4641* (2013.01); *H04L 49/15* (2013.01); *H04L 61/2557* (2013.01)

(58) Field of Classification Search
None
See application file for complete search history.

(56) References Cited

U.S. PATENT DOCUMENTS

| | | | | |
|---|---|---|---|---|
| 2015/0058463 A1* | 2/2015 | Wang | ................. | H04L 63/0236 709/223 |
| 2015/0058470 A1* | 2/2015 | Duda | ................... | H04L 61/103 709/224 |
| 2017/0026273 A1* | 1/2017 | Yao | ......................... | H04L 45/02 |
| 2020/0136955 A1* | 4/2020 | Chen | ................... | H04L 63/0272 |
| 2021/0226912 A1* | 7/2021 | Ranpise | ................ | H04L 45/745 |

FOREIGN PATENT DOCUMENTS

CN 107547677 A * 1/2018

OTHER PUBLICATIONS

Generic Protocol Extension for VXLAN—Network working group (Year: 2018).*

* cited by examiner

*Primary Examiner* — Younes Naji
(74) *Attorney, Agent, or Firm* — Joseph Mencher

(57) ABSTRACT

An address discovery system includes supplier switch devices that are each coupled to host device(s), and a distributor switch device that is coupled to each of the supplier switch devices via a network. The distributor switch device receives, via the network from each of the supplier switch devices, host address information for each host device that is coupled to that supplier switch device, and stores that host address information in a database. Subsequently, when a supplier switch device transmits a first address discovery request to the distributor switch device for second host address information for a second host device coupled to a second supplier switch device, the distributor switch device determines that the second host address information is included in the host address information stored in the database, retrieves the second host address information, and transmits the second host address information via the network to the first supplier switch device.

20 Claims, 19 Drawing Sheets

| SOURCE PORT 600a (VTEP device 204a) | DESTINATION PORT 600b (VTEP device 204b) | IP ADDRESS 600c (VTEP device 204a) | MAC ADDRESS 600d (VTEP device 204a) | VNI 600e (VTEP device 204a) | IP ADDRESS 600f (Host device 206a) | MAC ADDRESS 600g (Host device 206a) | VNI 600h (Host device 206a) | FFFFFFFF |
|---|---|---|---|---|---|---|---|---|
| | | | | | | | | |

FIG. 6A

| SOURCE PORT 702a (VTEP device 204c) | DESTINATION PORT 600b (VTEP device 204b) |
|---|---|
| IP ADDRESS 702b (VTEP device 204c) | |
| MAC ADDRESS 702c (VTEP device 204c) | |
| VNI 600e (VTEP device 204c) | |
| IP ADDRESS 702d (Host device 214a) | |
| 00:00:00:00:00:00 | |
| VNI 600e | |
| FFFFFFFF | |

FIG. 7B

| SOURCE PORT 802a (VTEP device 204b) | DESTINATION PORT 802b (VTEP device 204c) |
|---|---|
| IP ADDRESS 802c (VTEP device 212a) | |
| MAC ADDRESS 802d (VTEP device 212a) | |
| VNI 600e (VTEP device 212a) | |
| IP ADDRESS 702d (Host device 214a) | |
| MAC ADDRESS 802e (Host device 214a) | |
| VNI 802f (Host device 214a) | |
| FFFFFFFF | |

ADDRESS DISCOVERY SYSTEM

CROSS-REFERENCE TO RELATED APPLICATIONS

This application claims priority to Indian Provisional Application No. 202111023988, filed May 29, 2021, the disclosure of which is incorporated herein by reference in its entirety.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, may be utilized to connect server devices, desktop computing devices, laptop/notebook computing devices, tablet computing devices, mobile phones, and/or other host devices known in the art, and often perform address discovery operations in order to allow those different host devices to communicate with each other. For example, switch devices may be provided in a Virtual extensible Local Area Networks (VxLAN) in one or more datacenters, and may operate as VxLAN Tunnel EndPoint (VTEP) devices that connect host devices to each other. In some situations, VTEP devices may utilize the Address Resolution Protocol (ARP) to discover Media Access Control (MAC) addresses of host devices in the network (e.g., using Internet Protocol addresses of those host devices) in order to allow their connected host devices to communicate with those host devices that are connected to other VTEP devices. However, the conventional use of ARP raises some issues.

For example, one conventional ARP technique involves the VTEP devices in a network flooding VxLAN packets across multi-cast groups in the network to retrieve ARP information from VTEP device(s) in the network in order to learn the MAC address(es) of the host device(s) connected to those VTEP device(s). However, such "flood and learn" techniques greatly increase the amount of data traffic in the network, and can utilize substantial amounts of network bandwidth that can disrupt data traffic in some situations. Furthermore, such solutions require the enablement of multi-cast transport in the Layer 3 (L3) backbone of the network (which may not be an option for some networks), while the relatively high amounts of IP multi-cast data traffic (e.g., between datacenters) produced by such solutions may present configuration and maintenance challenges with regard to operation, performance, and scalability. One solution to such issues includes utilizing Head End Replication (HER) techniques, but such techniques require static or Ethernet Virtual Private Network (EVPN) configurations, and such configurations further require use of the Border Gateway Protocol (BGP) as an overlay protocol, which adds complexity to networks (particular for networks that do not require the BGP for any other networking functionality).

Accordingly, it would be desirable to provide an address discovery system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an address discovery engine that is configured to: receive, via a network from each of a plurality of switch devices, host address information for each host device that is coupled to that switch device; store the host address information in a database; receive, subsequent to storing the host address information in the database and via the network from a first switch device that is included in the plurality of switch devices, a first address discovery request for second host address information for a second host device that is coupled to a second switch device; determine that the second host address information is included in the host address information stored in the database; retrieve the second host address information from the database; and transmit, via the network to the first switch device, the second host address information.

BRIEF DESCRIPTION OF THE DRAWINGS

FIG. 6A is a schematic view illustrating an embodiment of a User Datagram Protocol (UDP) datagram that may be transmitted as part of the VxLAN data packet of FIG. 5 during the method of FIG. 4.

FIG. 7B is a schematic view illustrating an embodiment of a UDP datagram that may be transmitted as part of the VxLAN data packet of FIG. 5 during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
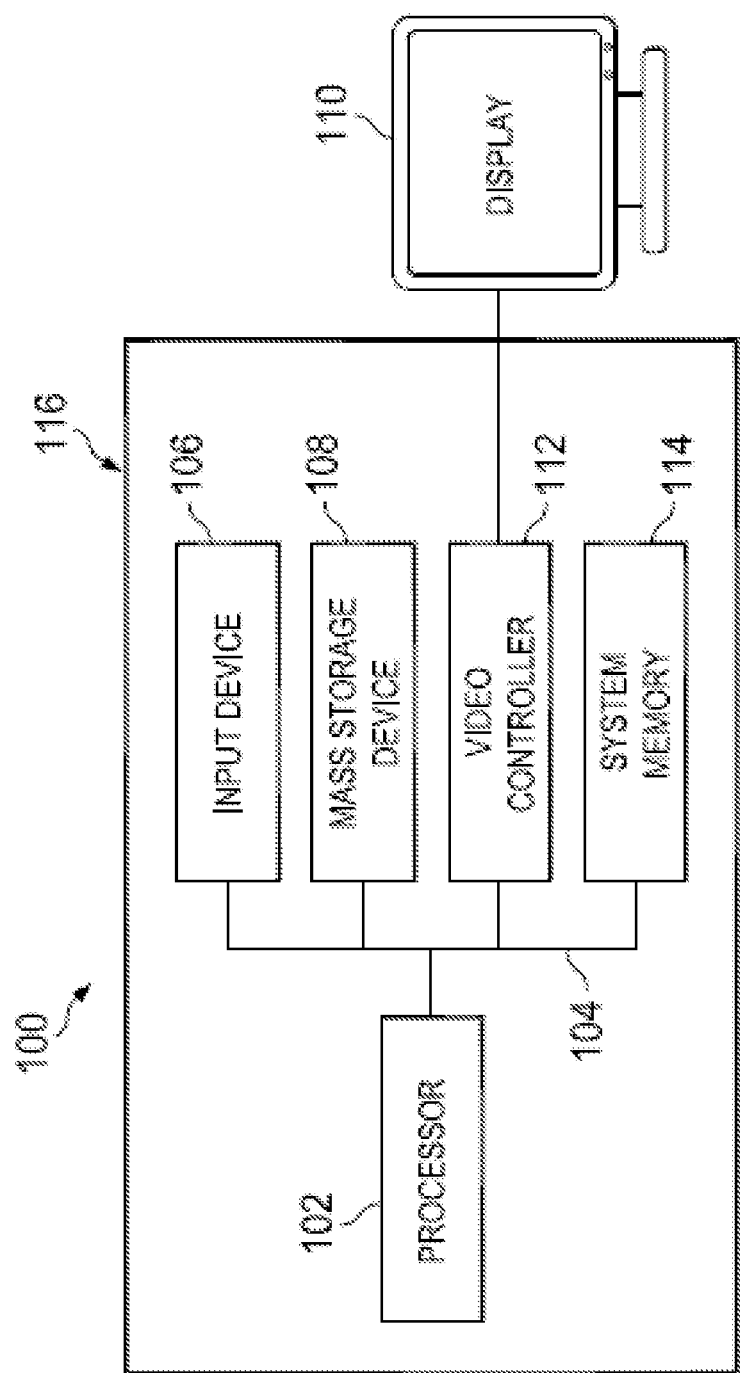
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
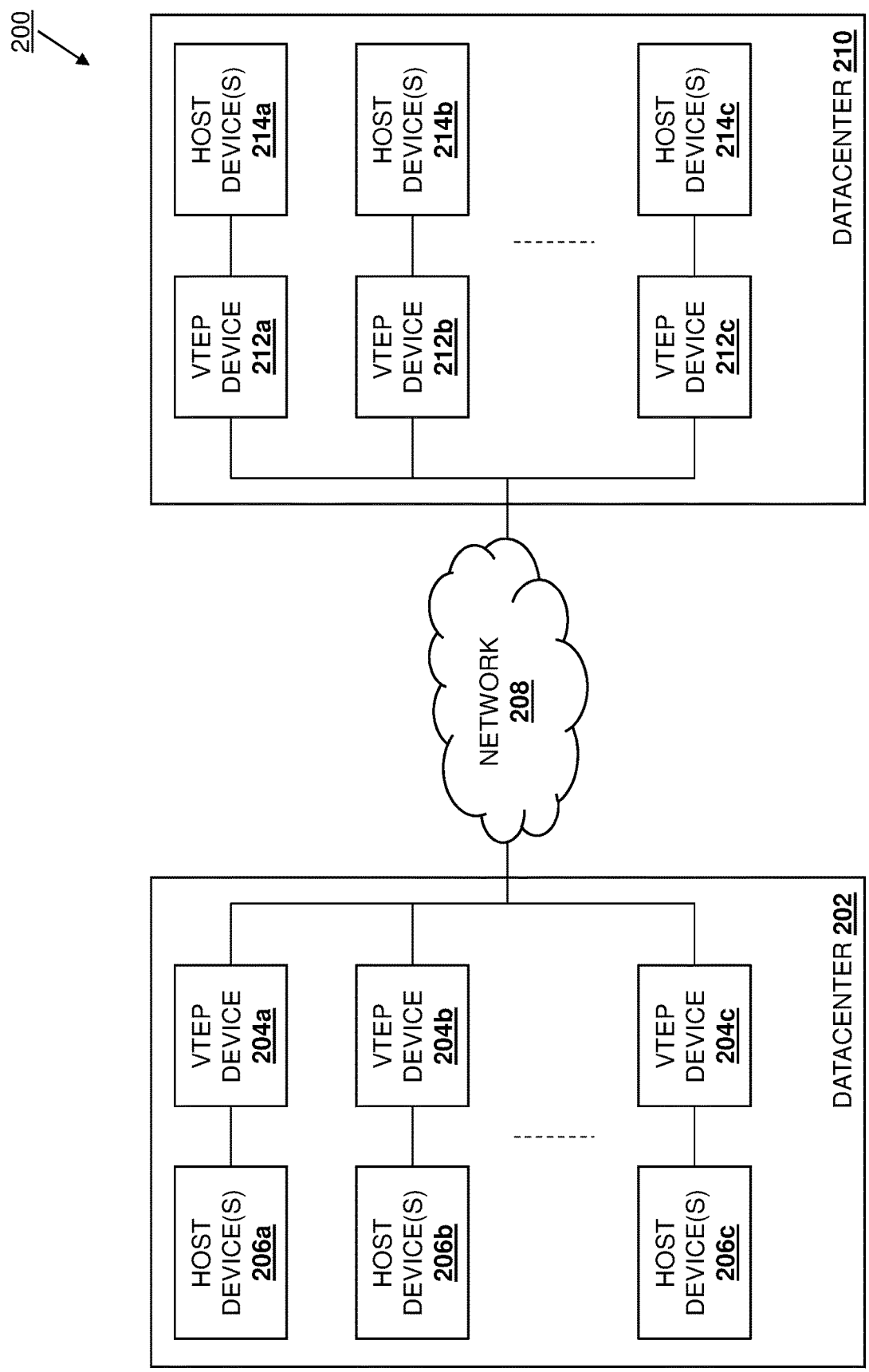
FIG. 2 is a schematic view illustrating an embodiment of a networked system that may utilize the address discovery system of the present disclosure.

Referring now to FIG. 2, an embodiment of a networked system 200 is illustrated that may utilize the address discovery system of the present disclosure. In the illustrated embodiment, the networked system 200 includes a datacenter 202 having a plurality of Virtual extensible Local Area Network (VxLAN) Tunnel EndPoints (VTEP) devices 204a, 204b, and up to 204c. In an embodiment, any or all of the VTEP devices 204a-204c may be provided by the IHS 100 discussed above with reference to FIG. 1, and/or may include some or all of the components of the IHS 100, and in specific examples may be provided by switch devices and/or other networking devices known in the art. However, while illustrated and discussed as being provided by switch devices or other networking devices, one of skill in the art in possession of the present disclosure will recognize that the VTEP devices 204a-204c provided in the networked system 200 may include any devices that may be configured to operate similarly as the VTEP devices 204a-204c discussed below.

Each of the VTEP devices 204a-204c may be coupled to one or more host devices, with illustrated embodiment including the VTEP device 204a coupled to host device(s) 206a, the VTEP device 204b coupled to host device(s) 206b, and the VTEP device 204c coupled to host device(s) 206c. In an embodiment, any or all of the host devices 206a-206c may be provided by the IHS 100 discussed above with reference to FIG. 1, and/or may include some or all of the components of the IHS 100, and in specific examples may be provided by server devices, desktop computing devices, laptop/notebook computing devices, tablet computing devices, mobile phones, and/or any other host devices that would be apparent to one of skill in the art in possession of the present disclosure. However, while illustrated and discussed as being provided by particular computing devices, one of skill in the art in possession of the present disclosure will recognize that the host devices 206a-206c provided in the networked system 200 may include any devices that may be configured to operate similarly as the host devices 206a-206c discussed below.

In the illustrated embodiment, each of the VTEP devices 204a-204c are coupled to a network 208 that may be provided by a Local Area Network (LAN), the Internet, combinations thereof, and/or any other network(s) that would be apparent to one of skill in the art in possession of the present disclosure. One of skill in the art in possession of the present disclosure will recognize that the network 208 is discussed below as being provided by an Internet Protocol (IP) network that includes a Virtual extensible Local Area Network (VxLAN), although other networks may benefit from the teachings of the present disclosure while remaining within its scope as well.

In the illustrated embodiment, the networked system 200 also includes a datacenter 210 having a plurality of VTEP devices 212a, 212b, and up to 212c, each of which are coupled to the network 208 as well. In an embodiment, any or all of the VTEP devices 212a-212c may be provided by the IHS 100 discussed above with reference to FIG. 1, and/or may include some or all of the components of the IHS 100, and in specific examples may be provided by switch devices and/or other networking devices known in the art. However, while illustrated and discussed as being provided by switch devices or other networking devices, one of skill in the art in possession of the present disclosure will recognize that the VTEP devices 212a-212c provided in the networked system 200 may include any devices that may be configured to operate similarly as the VTEP devices 212a-212c discussed below.

Each of the VTEP devices 212a-212c may be coupled to one or more host devices, with illustrated embodiment including the VTEP device 212a coupled to host device(s) 214a, the VTEP device 212b coupled to host device(s) 214b, and the VTEP device 212c coupled to host device(s) 214c. In an embodiment, any or all of the host devices 214a-214c may be provided by the IHS 100 discussed above with reference to FIG. 1, and/or may include some or all of the components of the IHS 100, and in specific examples may be provided by server devices, desktop computing devices, laptop/notebook computing devices, tablet computing devices, mobile phones, and/or any other host devices that would be apparent to one of skill in the art in possession of the present disclosure. However, while illustrated and discussed as being provided by particular computing devices, one of skill in the art in possession of the present disclosure will recognize that the host devices 214a-214c provided in the networked system 200 may include any devices that may be configured to operate similarly as the host devices 214a-214c discussed below.

However, while a specific networked system 200 has been illustrated and described, one of skill in the art in possession of the present disclosure will recognize that the address discovery system of the present disclosure may include a variety of components and component configurations while remaining within the scope of the present disclosure as well. For example, while illustrated and described below as a two-datacenter system utilizing a VxLAN with VTEP devices, one of skill in the art in possession of the present disclosure will recognize that the networked system 200 may include be provided by a single datacenter, more than two datacenters, or may be provided in non-datacenter scenarios, and may utilize networking techniques and/or technologies other than VxLAN while remaining within the scope of the present disclosure as well.

Figure 3:
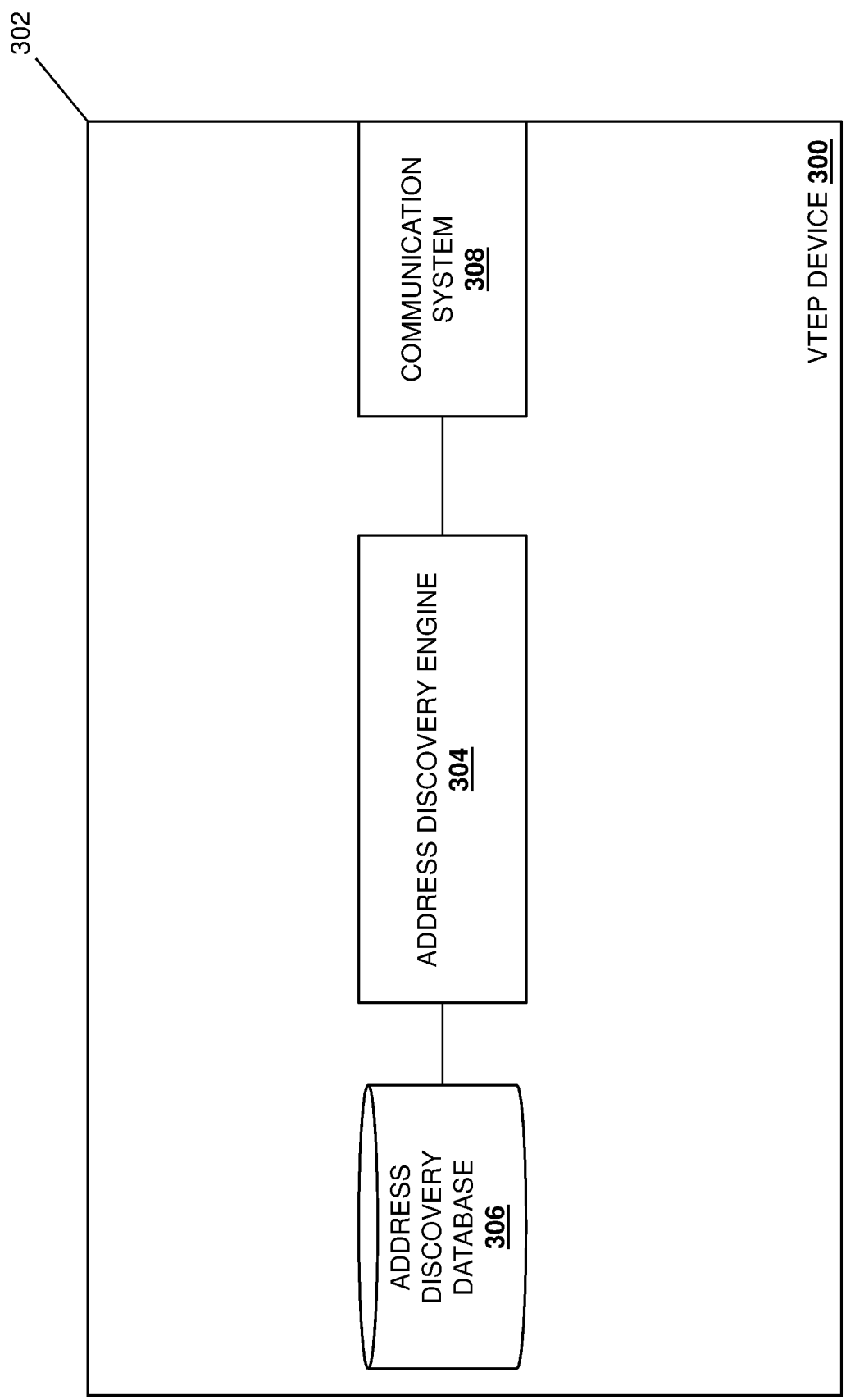
FIG. 3 is a schematic view illustrating an embodiment of a VTEP device that may be provided in the networked system of FIG. 2.

Referring now to FIG. 3, an embodiment of a VTEP device 300 is illustrated that may provide any or all of the VTEP devices 204a-204c and/or 214a-214c discussed above with reference to FIG. 2. As such, the VTEP device 300 may be provided by the IHS 100 discussed above with reference to FIG. 1 and/or may include some or all of the components of the IHS 100, and in specific examples may be provided by a switch device or other networking devices known in the art. Furthermore, while illustrated and discussed as being provided by switch devices or other networking devices known in the art, one of skill in the art in possession of the present disclosure will recognize that the functionality of the VTEP device 300 discussed below may be provided by other devices that are configured to operate similarly as the VTEP device 300 discussed below. In the illustrated embodiment, the VTEP device 300 includes a chassis 302 that houses the components of the VTEP device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an address discovery engine 304 that is configured to perform the functionality of the address discovery engines and/or VTEP devices discussed below.

The chassis 302 may also house a storage system (not illustrated, but which may include the storage 108 discussed above with reference to FIG. 1) that is coupled to the address discovery engine 304 (e.g., via a coupling between the storage system and the processing system) and that includes an address discovery database 306 that is configured to store any of the information utilized by the address discovery engine 304 discussed below. The chassis 302 may also house a communication system 308 that is coupled to the address discovery engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. While a specific VTEP device 300 has been illustrated, one of skill in the art in possession of the present disclosure will recognize that VTEP devices (or other devices operating according to the teachings of the present disclosure in a manner similar to that described below for the VTEP device 300) may include a variety of components and/or component configurations for providing conventional VTEP device functionality, as well as the functionality discussed below, while remaining within the scope of the present disclosure as well.

Figure 4:
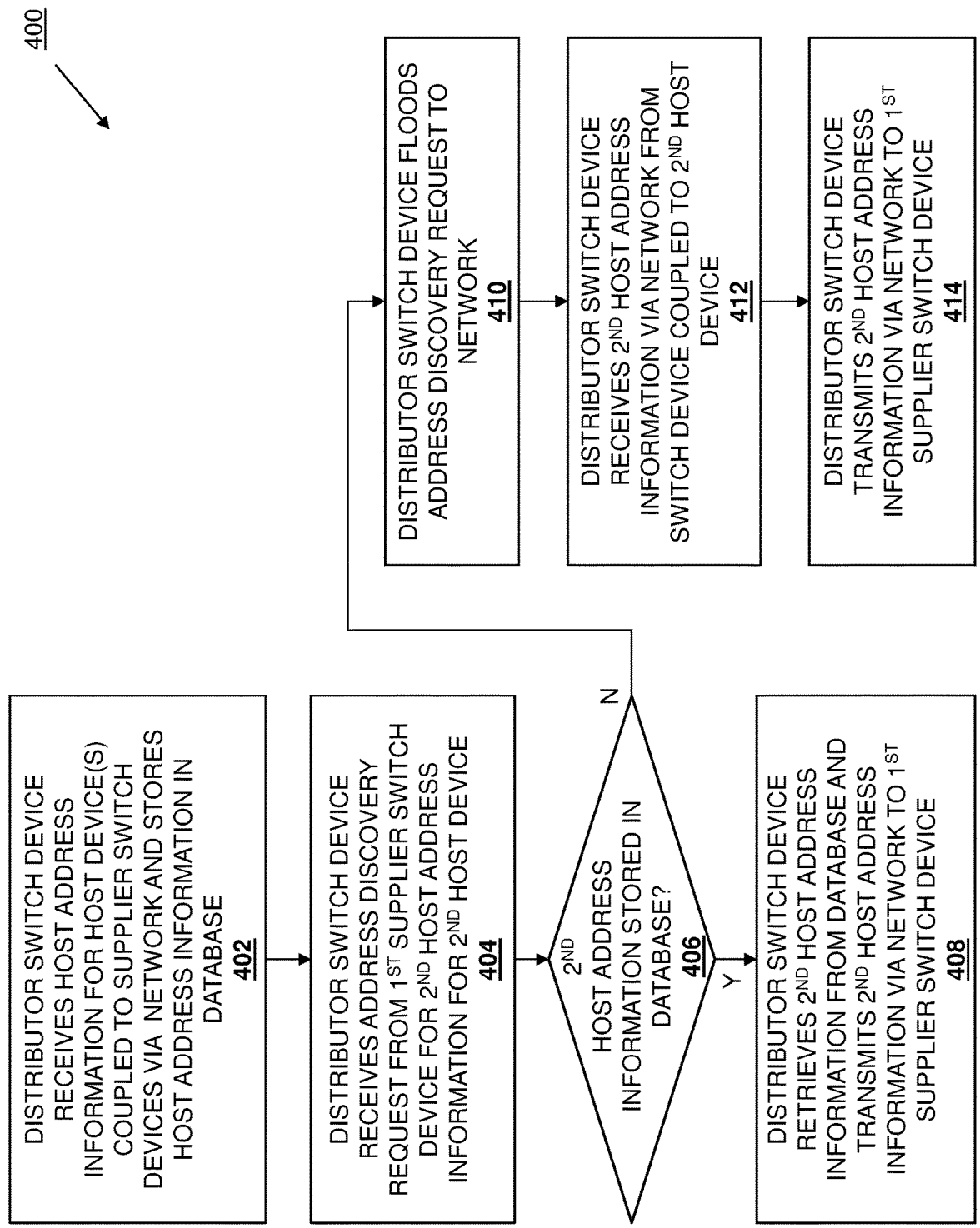
FIG. 4 is a flow chart illustrating an embodiment of a method for discovering addresses.

Referring now to FIG. 4, an embodiment of a method 400 for discovering addresses is illustrated. As discussed below, the systems and methods of the present disclosure provide a distributor switch device in a network that collects address discovery information from supplier switch devices for their connected host devices and stores it in a database, and when a first switch device in the network is connected to a first host device that wants to communicate with a second host device in the network, the distributor switch device finds the address discovery information for that second host device in its network, and provides it to the first switch device to enable that communication. For example, the address discovery system of the present disclosure may include supplier switch devices that are each coupled to host device(s), and a distributor switch device that is coupled to each of the supplier switch devices via a network. The distributor switch device receives, via the network from each of the supplier switch devices, host address information for each host device that is coupled to that supplier switch device, and stores that host address information in a database. Subsequently, when a supplier switch device transmits a first address discovery request to the distributor switch device for second host address information for a second host device coupled to a second supplier switch device, the distributor switch device determines that the second host address information is included in the host address information stored in the database, retrieves the second host address information, and transmits the second host address information via the network to the first supplier switch device. As such, address discovery is enabled in the network without the bandwidth and configuration issues associated with multi-cast address discovery techniques, or the configuration issues associated with EVPN/BGP techniques.

Figure 5:
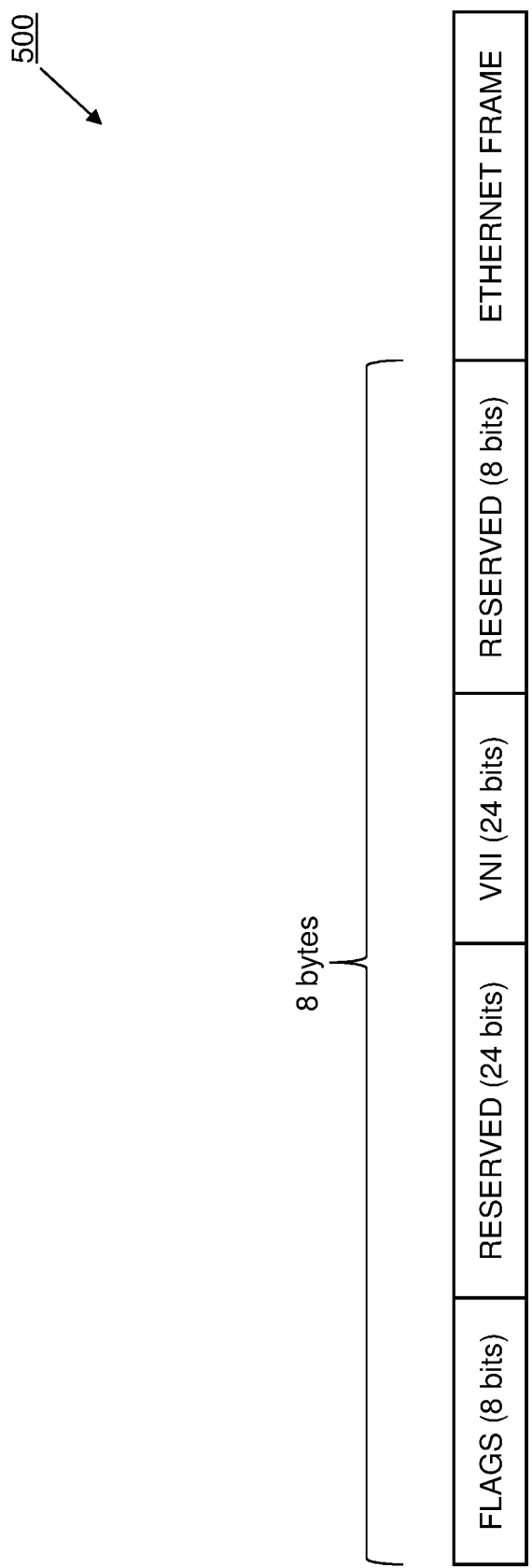
FIG. 5 is a schematic view illustrating an embodiment of a VxLAN data packet that may be utilized during the method of FIG. 4.

In the embodiment of the method 400 discussed below, the networked system 200 includes switch devices that are configured as VTEP devices 204a-204c and 212a-212c and included in a VxLAN, with those VTEP devices 204a-204c and 212a-212c transmitting VxLAN data packets are part of the method 400. With reference to FIG. 5, an embodiment of a VxLAN data packet 500 is illustrated that includes an 8-byte VxLAN header having an 8-bit "flags" section, a 24-bit "reserved" section, a 24-bit "Virtual Network Interface (VNI)" section, and an 8-bit "reserved" section, along with an ethernet frame. As will be appreciated by one of skill in the art in possession of the present disclosure, the 8-bit "flags" section of conventional VxLAN data packets currently use only bit 3 as an "I" flag that indicates whether a corresponding VNI in the VxLAN data packet is valid. However, in the examples of the communications during the method 400 below, the 8-bit "flags" section in the VxLAN data packet 500 utilizes bit 2 to identify whether the address discovery system of the present disclosure is being utilized via the VxLAN data packet 500 (e.g., if bit 2 is set to "1" the address discovery system of the present disclosure is being utilized, otherwise conventional address discovery techniques should be used), bit 5 to indicate the VxLAN data packet 500 is being used to provide address discovery information, bit 7 to indicate the VxLAN data packet 500 is being used to request address discovery, and bit 6 to indicate the VxLAN data packet 500 is being used to reply to a request for address discovery. However, one of skill in the art in possession of the present disclosure will appreciate how the different bits in the 8-bit "flags" section in the VxLAN data packet 500 may be utilized to provide the functionality below while remaining within the scope of the present disclosure as well.

Furthermore, one of skill in the art in possession of the present disclosure will recognize how 8 bits in the 24-bit "reserved" section of the VxLAN data packet 500 may include encrypted code, the 24-bit "VNI" section of the VxLAN data packet 500 may include a VNI identifier number (which allows approximately 16 million possible different VNI identifier numbers), and the 8-bit "reserved" section of the VxLAN data packet 500 may be set to zero by VTEP devices that transmit the VxLAN data packet 500, and ignored by VTEP devices that receive the VxLAN data packet 500. However, while a specific VxLAN data packet 500 has been illustrated and described, one of skill in the art in possession of the present disclosure will appreciate how other data packets may be utilized in the address discovery system of the present disclosure while remaining within it scope as well.

The method 400 begins at block 402 where a distributor switch device receives host address information for one or more host devices coupled to supplier switch devices via network, and stores the host address information in a database. In an embodiment, during or prior to the method 400, at least one of the VTEP devices 204a-204c and 212a-212c may be configured to operate as a distributor VTEP device, with the remaining VTEP devices configured to operate as supplier VTEP devices. In the specific examples provided below, the VTEP device 204b is configured to operate as the distributor VTEP device 204b, while the VTEP devices 204a, 204c, and 212a-212c are configured to operate as the supplier VTEP devices 204a, 204c, and 212a-212c. However, one of skill in the art in possession of the present disclosure will appreciate how any of the VTEP devices 204a-204c and 212a-212c may be configured to operate as a distributor VTEP device while remaining within the scope of the present disclosure as well. Furthermore, while only a single VTEP device is described in the examples below, one of skill in the art in possession of the present disclosure will appreciate how one or more secondary/backup distributor VTEP devices may be provided with a primary distributor VTEP device, with those secondary/backup distributor VTEP devices operating as supplier VTEP devices until the primary distributor VTEP device is unavailable (at which time a secondary/backup distributor VTEP device may take over distributor VTEP device operations when it is the only secondary/backup distributor VTEP device, or based on its priority over any other secondary/backup distributor VTEP devices).

In some embodiments, the designation of the VTEP devices as distributor and supplier VTEP devices may be a manual process in which a network administrator configures those VTEP device (e.g., via a Command Line Interface (CLI), via a Graphical User Interface (GUI), etc.). In such embodiments, the VTEP devices may operate to auto-discover the distributor VTEP device (with the distributor VTEP auto-discovering itself when it receives back its own MAC address as part of that auto-discovery process). However, in other embodiments, the designation of the VTEP devices as distributor and supplier VTEP devices may be an automated process in which those VTEP devices operate to elect the distributor VTEP device(s), with VTEP devices not elected as a distributor VTEP device then configured as supplier VTEP devices. However, while several different options have been described for providing the distributor VTEP device and supplier VTEP devices in the networked system 200, one of skill in the art in possession of the present disclosure will appreciate how distributor VTEP device(s) and supplier VTEP devices that perform the functionality described below may be provided in a variety of manners that will fall within the scope of the present disclosure as well.

In an embodiment, at block 402, each of the supplier VTEP devices 204a, 204c, and 212a-212c may generate host address information for its connected host device(s). For example, with reference back to FIG. 5, at block 402 the address discovery engine 304 in each of the supplier VTEP devices 204a/300, 204c/300, and 212a-212c/300 may generate the VxLAN data packet 500 and set the bit 2 of the 8-bit "flags" section in the VxLAN data packet 500 to identify that the address discovery system of the present disclosure is being utilized (e.g., by setting bit 2 to "1" as discussed above), while setting bit 5 of the 8-bit "flags" section in the VxLAN data packet 500 to indicate the VxLAN data packet 500 is being used to provide host address information. Furthermore, with reference to FIG. 6A, a specific example of a User Datagram Protocol (UDP) datagram 600 is illustrated that may be encapsulated in the VxLAN data packet 500 generated by the supplier VTEP device 204a, and one of skill in the art in possession of the present disclosure will appreciate how similar UDP datagrams may be encapsulated in the VxLAN data packets generated by the supplier VTEP devices 204c and 212a-212c that are providing host address information (but with different information in that UDP datagram) while remaining within the scope of the present disclosure as well.

In the specific example illustrated in FIG. 6A, the UDP datagram 600 encapsulated in the VxLAN data packet 500 generated by the supplier VTEP device 204a includes an identifier for a source port 600a of the supplier VTEP device 204a, and one of skill in the art in possession of the present disclosure will appreciate how each of the other supplier VTEP devices 204b and 212a-212c will provide an identifier for their respective source port in the UDP datagram 600 when providing address information. The UDP datagram 600 encapsulated in the VxLAN data packet 500 generated by the supplier VTEP device 204a also includes an identifier for a destination port 600b of the distributor VTEP device 204b, and that destination port 600b may have been reserved for the distributor VTEP device 204b and retrieved by the supplier VTEP device 204a (as well as by any of the other supplier VTEP devices 204b and 212a-212c) via overlay protocols and/or conventional routing mechanisms that would be apparent to one of skill in the art in possession of the present disclosure.

The UDP datagram 600 encapsulated in the VxLAN data packet 500 generated by the supplier VTEP device 204a also includes identifiers for an IP address 600c and a MAC address 600d of the supplier VTEP device 204a, as well as an identifier for a VNI 600e utilized by the supplier VTEP device 204a (which may begin with a zero that is followed by the 24-bit VNI identifier). As discussed above, while each of the VTEP devices 204a-204c and 212a-212c will have different IP addresses and MAC addresses, those VTEP devices may utilize a common VNI, and thus the identifier for the VNI 600e may be the same in the UDP datagram provided by each of the supplier VTEP devices 204a, 204c and 212a-212c when providing host address information. In the illustrated example, the UDP datagram 600 encapsulated in the VxLAN data packet 500 generated by the supplier VTEP device 204a also includes identifiers for an IP address 600f and a MAC address 600g of the host device 206a that is coupled to the supplier VTEP device 204a, as well as an identifier for a VNI 600e utilized by the host device 206a (which may begin with a zero that is followed by the 24-bit VNI identifier). In the illustrated example, the UDP datagram 600 also includes a message end indicator (e.g., "FFFFFFFF") that indicates that the host address information being provided in the UDP datagram 600 has ended.

As will be appreciated by one of skill in the art in possession of the present disclosure, while only a single host device 206a coupled to the supplier VTEP device 204a has its host address information (e.g., its IP address, MAC address, and VNI) identified in the UDP datagram 600, host address information (e.g., respective sets of an IP address, MAC address, and VNI) for any other host devices coupled to the supplier VTEP device 204a may be included in the UDP datagram 600 while remaining within the scope of the present disclosure as well. Furthermore, one of skill in the art in possession of the present disclosure will appreciate how UDP datagrams transmitted by the supplier VTEP devices 204b and 212a-212c may include corresponding IP address, MAC address, and VNI identifiers for their respective connected host device(s) as well.

Figure 6B:
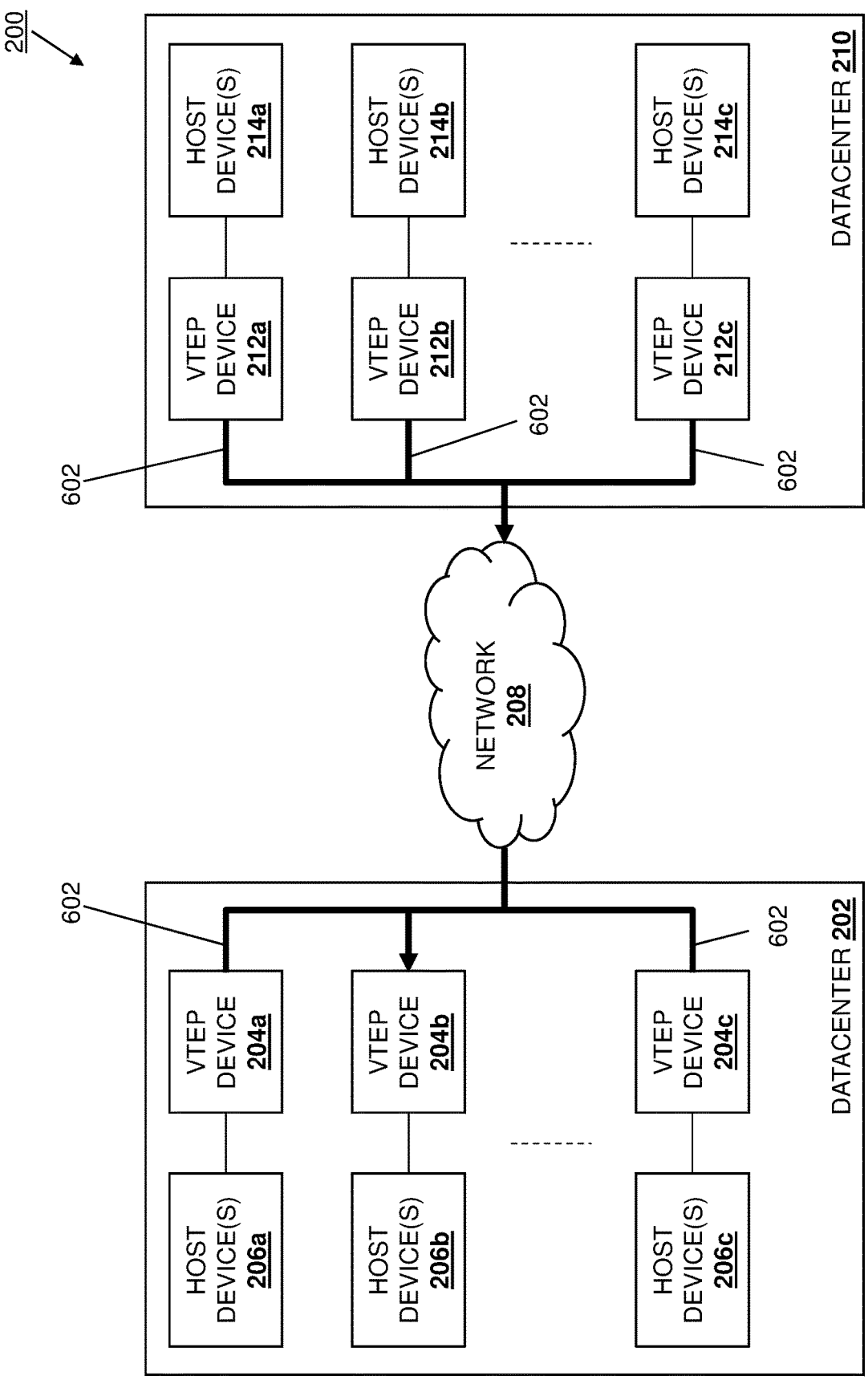
FIG. 6B is a schematic view illustrating an embodiment of the networked system of FIG. 2 operating during the method of FIG. 4.
Figure 6C:
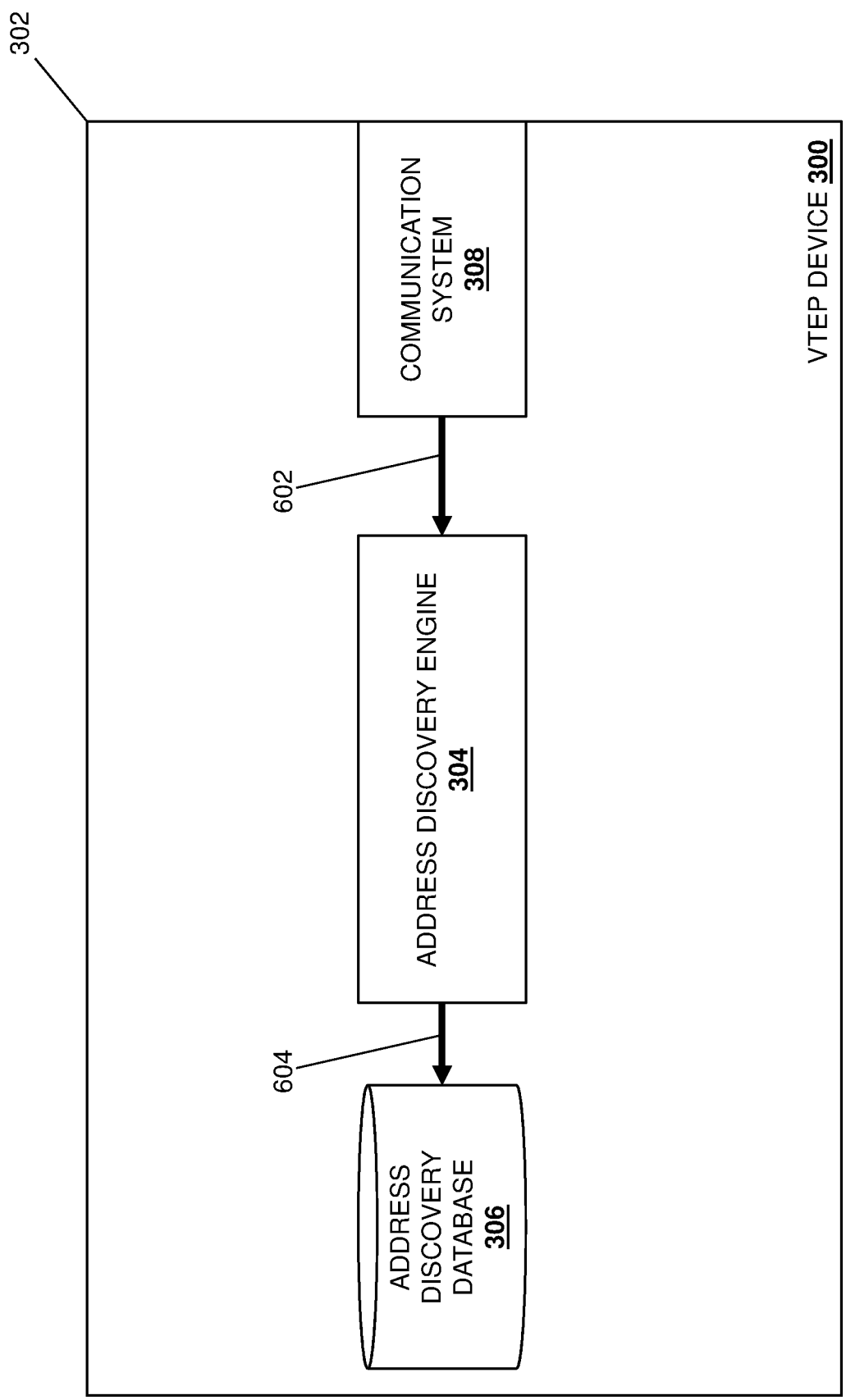
FIG. 6C is a schematic view illustrating an embodiment of the VTEP device of FIG. 3 operating during the method of FIG. 4.

As such, with reference to FIG. 6B, the address discovery engine 304 in each of the supplier VTEP devices 204a, 204c, and 212a-212c may perform address information transmission operations 602 that include generating the VxLAN data packet encapsulating the UDP datagram as described above, and transmitting that VxLAN data packet via its communication system 308 to the VTEP device 204b (e.g., via an underlay network in the networked system 200). As illustrated in FIG. 6C and as part of the address information transmission operations 602, the address discovery engine 304 in the distributor VTEP device 204b/300 may then receive the host address information transmitted by each of the supplier VTEP devices 204a, 204c, and 212a-212c via its communication system 308. Furthermore, the address discovery engine 304 in the distributor VTEP device 204b/300 may then perform address information storage operations 604 that include storing the host address information received from each of the supplier VTEP devices 204a, 204c, and 212a-212c in its address discovery database 306. As such, in a specific example in which the ARP is utilized and following block 402, the distributor VTEP device 204b may store the ARP information of each host device and supplier VTEP device in the networked system 200.

The method 400 then proceeds to block 404 where the distributor switch device receives an address discovery request from a first supplier switch device for second host address information for a second host device. In the examples below, the supplier VTEP device 204c generates and transmits the address discovery request to the distributor VTEP device 204b at block 404, but one of skill in the art in possession of the present disclosure will appreciate that any supplier VTEP device connected to a host device that wishes to communicate with another host device in the networked system 200 may transmit the address discovery request to a designated distributor VTEP device at block 404 while remaining within the scope of the present disclosure as well.

Figure 7A:
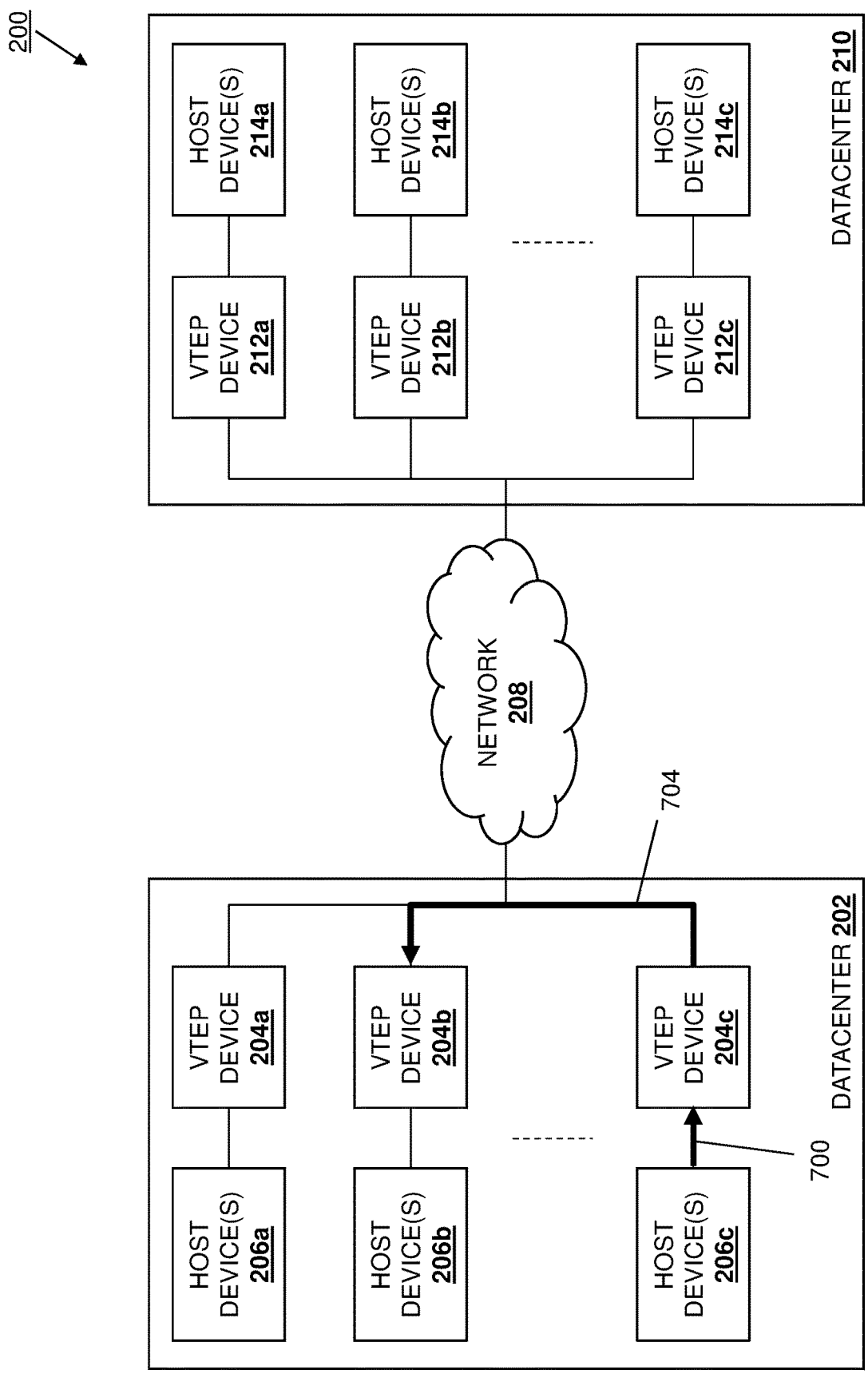
FIG. 7A is a schematic view illustrating an embodiment of the networked system of FIG. 2 operating during the method of FIG. 4.

With reference to FIG. 7A, in an embodiment of block 404, the host device 206c may perform host device communication operations 700 that include generating a host device communication that is directed to the host device 214a in the examples below (e.g., by identifying an IP address for the host device 214a), and transmitting that host device communication to the supplier VTEP device 204c. In response to receiving the host device communication, the address discovery engine 304 in the supplier VTEP device 204c/300 may determine that address discovery operations are required to transmit the host device communication due to, for example, the IP address of the host device 214a that is identified in the host device communication not being associated with a MAC address of the host device 214a in the address discovery database 306 in the supplier VTEP device 204c.

In response to determining that the address discovery operations are required to transmit the host device communication, the supplier VTEP device 204c may generate an address discovery request for the host device 214a. For example, with reference back to FIG. 5, at block 402 the address discovery engine 304 in the supplier VTEP device 204c/300 may generate the VxLAN data packet 500 and set the bit 2 of the 8-bit "flags" section in the VxLAN data packet 500 to identify that the address discovery system of the present disclosure is being utilized (e.g., by setting bit 2 to "1" as discussed above), while setting bit 7 of the 8-bit "flags" section in the VxLAN data packet 500 to indicate the VxLAN data packet 500 is being used to provide an address discovery request. Furthermore, with reference to FIG. 7B, a specific example of a User Datagram Protocol (UDP) datagram 702 is illustrated that may be encapsulated in the VxLAN data packet 500 generated by the supplier VTEP device 204c, and one of skill in the art in possession of the present disclosure will appreciate how similar UDP datagrams may be encapsulated in VxLAN data packets generated by other supplier VTEP devices making address discovery requests (but with different information in that UDP datagram) while remaining within the scope of the present disclosure as well.

In the specific example illustrated in FIG. 7B, the UDP datagram 702 encapsulated in the VxLAN data packet 500 generated by the supplier VTEP device 204c includes an identifier for a source port 702a of the supplier VTEP device 204c, and one of skill in the art in possession of the present disclosure will appreciate how other supplier VTEP devices will provide an identifier for their source port in similar UDP datagrams utilized in address discovery requests. The UDP datagram 702 encapsulated in the VxLAN data packet 500 generated by the supplier VTEP device 204c also includes the identifier for the destination port 600b of the distributor VTEP device 204b which, as discussed above, may have been retrieved by the supplier VTEP device 204c via overlay protocols and/or conventional routing mechanisms that would be apparent to one of skill in the art in possession of the present disclosure.

The UDP datagram 702 encapsulated in the VxLAN data packet 500 generated by the supplier VTEP device 204c also includes identifiers for an IP address 702b and a MAC address 702c of the supplier VTEP device 204c, as well as the identifier for the VNI 600e utilized by the supplier VTEP device 204c (which may begin with a zero that is followed by the 24-bit VNI identifier). As discussed above, while each of the VTEP devices 204a-204c and 212a-212c will have different IP addresses and MAC addresses, those VTEP devices may utilize a common VNI, and thus the identifier for the VNI 600e may be the same in UDP datagrams provided by any of the supplier VTEP devices as part of address discovery requests. In the illustrated example, the UDP datagram 702 encapsulated in the VxLAN data packet 500 generated by the supplier VTEP device 204c also includes an identifier for an IP address 702d of the host device 214a, with the MAC address section set to zero (e.g., the "00:00:00:00:00:00" MAC address), and with the common VNI identifier (i.e., VNI 600e) shared by the VTEP devices included in the VNI section provided adjacent the MAC address section that is set to zero. In the illustrated example, the UDP datagram 702 also includes a message end indicator (e.g., "FFFFFFFF") that indicates that the address discovery request being provided in the UDP datagram 702 has ended.

Figure 7C:
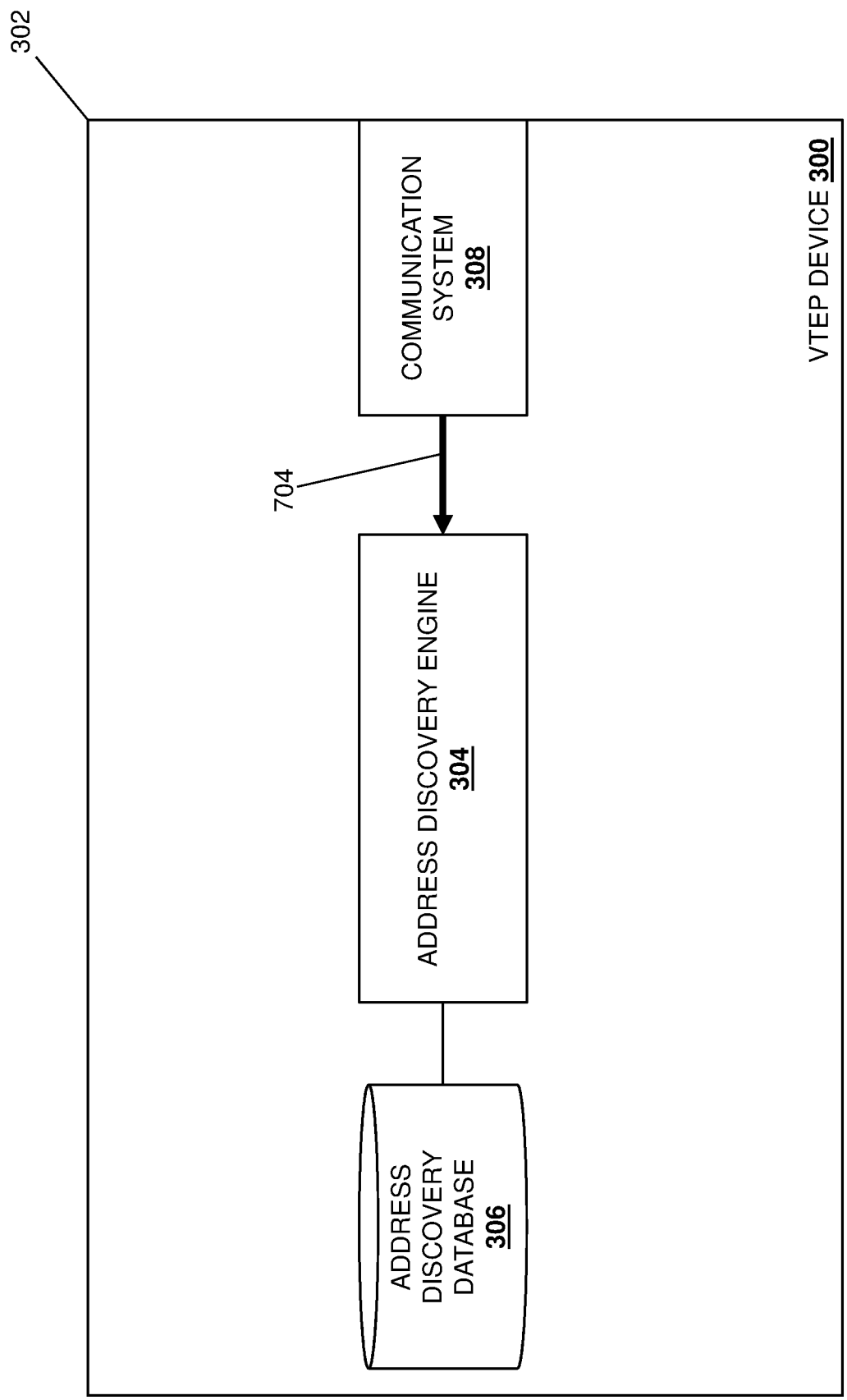
FIG. 7C is a schematic view illustrating an embodiment of the VTEP device of FIG. 3 operating during the method of FIG. 4.

As such, with reference back to FIG. 7A, the address discovery engine 304 in the supplier VTEP device 204a/300 may perform address discovery request transmission operations 704 that include generating the VxLAN data packet encapsulating the UDP datagram as described above, and transmitting that VxLAN data packet via its communication system 308 to the VTEP device 204b (e.g., via an underlay network in the networked system 200). As will be appreciated by one of skill in the art in possession of the present disclosure, the VxLAN data packet transmitted as part of the address discovery request transmission operations 704 is a unicast data communication transmission, as opposed to conventional multi-cast data communication transmission utilized to discover addresses in the conventional address discovery systems discussed above. As illustrated in FIG. 7C and as part of the address discovery request transmission operations 704, the address discovery engine 304 in the distributor VTEP device 204b/300 may then receive the address discovery request transmitted by the supplier VTEP device 204c/300 via its communication system 308.

Figure 8A:
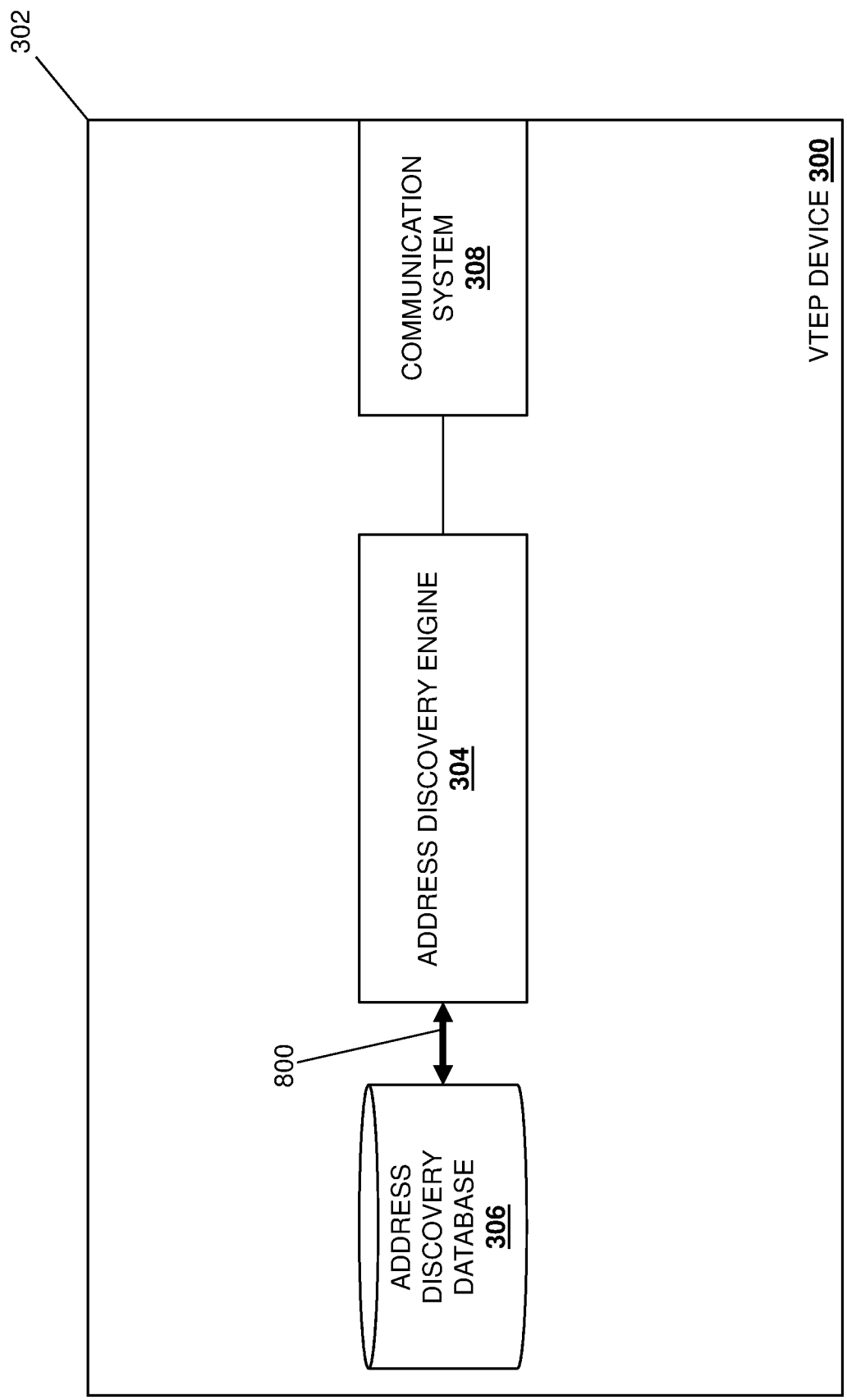
FIG. 8A is a schematic view illustrating an embodiment of the VTEP device of FIG. 3 operating during the method of FIG. 4.

The method 400 then proceeds to decision block 406 where it is determined whether the second host address information is stored in the database. With reference to FIG. 8A, in an embodiment of decision block 406 and in response to receiving the address discovery request from the supplier VTEP device 204c at block 404, the address discovery engine 304 in the distributor VTEP device 204b/300 may perform address discovery database search operations 306 that may include determining whether the IP address identified in the address discovery communication for the host device 214a is included in its address discovery database 306 and associated with a MAC address for the host device 214a. While the example above describes the address discovery information (e.g., the IP address, MAC address, and VNI) for the host device 214a and supplier VTEP device 212a having been provided to the distributor VTEP device 204b/300 and stored in its address discovery database 306 at block 402, the discussion below also describes an alternate embodiment in which the address discovery information for the host device 214a was not provided to the distributor VTEP device 204b/300 and stored in it address discovery database 306 at block 402 in order to describe how the address discovery system deals with such as situation.

Figure 8B:
FIG. 8B is a schematic view illustrating an embodiment of a UDP datagram that may be transmitted as part of the VxLAN data packet of FIG. 5 during the method of FIG. 4.

If, at decision block 406, it is determined that the second host address information is stored in the database, the method 400 proceeds to block 408 where the distributor switch devices retrieves second host address information from the database and transmits the second host address information via the network to the first supplier switch device. With reference to FIG. 8B, in an embodiment of block 408 and in response to determining that the IP address identified in the address discovery communication for the host device 214a is included in its address discovery database 306 and associated with a MAC address for the host device 214a, the address discovery engine 304 in the distributor VTEP device 204b/300 may generate an address discovery reply communication.

For example, with reference back to FIG. 5, at block 402 the address discovery engine 304 in the distributor VTEP device 204b/300 may generate the VxLAN data packet 500 and set the bit 2 of the 8-bit "flags" section in the VxLAN data packet 500 to identify that the address discovery system of the present disclosure is being utilized (e.g., by setting bit 2 to "1" as discussed above), while setting bit 6 to indicate the VxLAN data packet 500 is being used to provide an address discovery reply. Furthermore, with reference to FIG. 8B, a specific example of a User Datagram Protocol (UDP) datagram 802 is illustrated that may be encapsulated in the VxLAN data packet 500 generated by the distributor VTEP device 204b, and one of skill in the art in possession of the present disclosure will appreciate how similar UDP datagrams may be encapsulated in VxLAN data packets generated by the distributor VTEP device 204b to other supplier VTEP devices that have provided address discovery requests (but with different information in that UDP datagram) while remaining within the scope of the present disclosure as well.

In the specific example illustrated in FIG. 8B, the UDP datagram 802 encapsulated in the VxLAN data packet 500 generated by the distributor VTEP device 204b includes an identifier for a source port 802a of the distributor VTEP device 204b. The UDP datagram 802 encapsulated in the VxLAN data packet 500 generated by the distributor VTEP device 204b also includes the identifier for the destination port 802b of the supplier VTEP device 204c, and one of skill in the art in possession of the present disclosure will appreciate how identifiers for destination ports of other supplier VTEP devices may be provided in similar UDP datagrams utilized to reply to address discovery requests.

The UDP datagram 802 encapsulated in the VxLAN data packet 500 generated by the distributor VTEP device 204b also includes identifiers for an IP address 802c and a MAC address 802d of the supplier VTEP device 212a, as well as the identifier for the VNI 600e utilized by the supplier VTEP device 212a (which may begin with a zero that is followed by the 24-bit VNI identifier). As discussed above, while each of the VTEP devices 204a-204c and 212a-212c will have different IP addresses and MAC addresses, those VTEP devices may utilize a common VNI, and thus the identifier for the VNI 600e may be the same in UDP datagrams provided for any other supplier VTEP devices as part of address discovery replies. In the illustrated example, the UDP datagram 802 encapsulated in the VxLAN data packet 500 generated by the distributor VTEP device 204b also includes the identifier for the IP address 702d and a MAC address 802e of the host device 214a, as well as the identifier for a VNI 802f utilized by the host device 214a (which may begin with a zero that is followed by the 24-bit VNI identifier). In the illustrated example, the UDP datagram 802 also includes a message end indicator (e.g., "FFFFFFFF") that indicates that the address request reply being provided in the UDP datagram 802 has ended.

Figure 9:
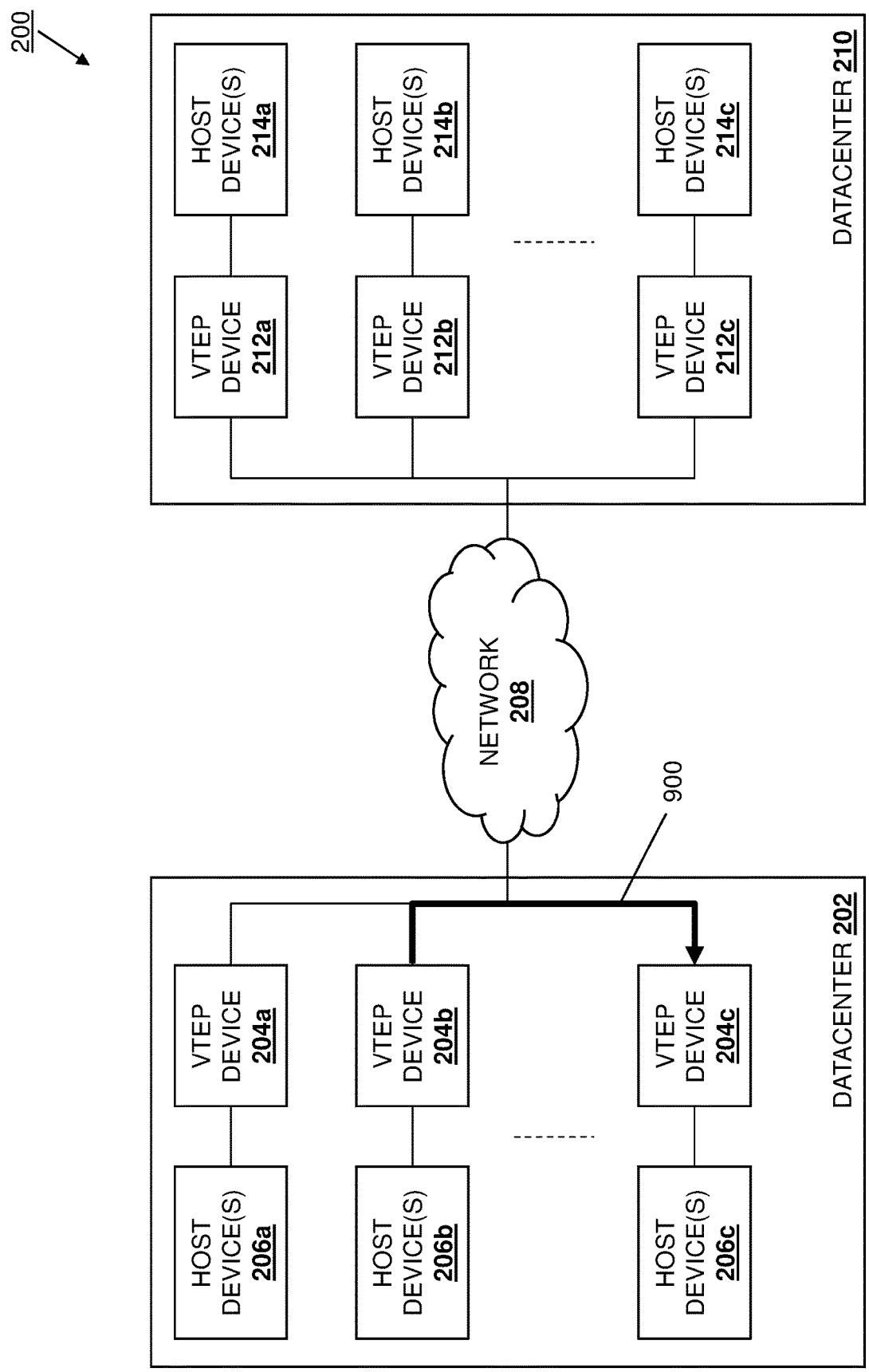
FIG. 9 is a schematic view illustrating an embodiment of the networked system of FIG. 2 operating during the method of FIG. 4.
Figure 10:
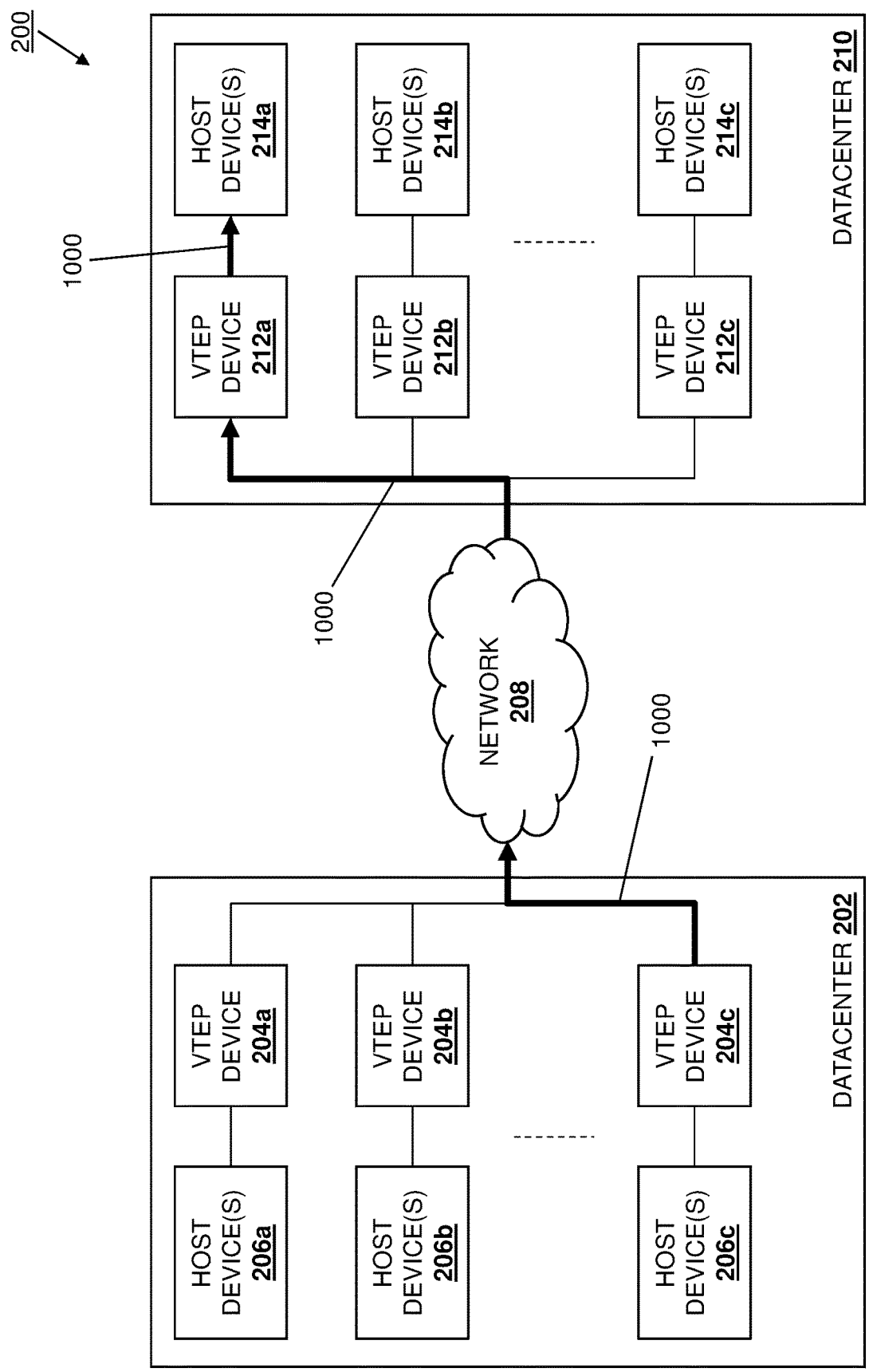
FIG. 10 is a schematic view illustrating an embodiment of the networked system of FIG. 2 operating during the method of FIG. 4.

With reference to FIG. 9, the address discovery engine 304 in the distributor VTEP device 204b/300 may then perform address discovery reply operations 900 that include transmitting the address discovery reply communication discussed above via its communication system 308 to the supplier VTEP device 204c such that the address discovery engine 304 in the supplier VTEP device 204c/300 receives that address discovery reply communication via its communication system 308. As will be appreciated by one of skill in the art in possession of the present disclosure, the VxLAN data packet transmitted as part of the address discovery reply operations 704 is a unicast data communication transmission. With reference to FIG. 10, the address discovery engine 304 in the supplier VTEP device 204c/300 may then utilize the address information for the host device 214a and the supplier VTEP device 212a to perform host device communication operations 1000 that include transmitting the host device communication received from its connected host device 206c through its communication system 308 and via the network 208 and the supplier VTEP device 212a to the host device 214a. In some embodiments, the address discovery engine 304 in the supplier VTEP device 204c/300 may also store THE address information for the supplier VTEP device 212a and host device 214 in its address discovery database 308 for future use in transmitting host device communications to the host device 214a. As such, continuing with the specific example discussed above, the address discovery engine 304 in the supplier VTEP device 204c/300 may utilize the IP address, MAC address, and VNI received for the supplier VTEP device 212a, along with the IP address, MAC address, and VNI received for the host device 214a, to transmit the host device communication received from its connected host device 206c via the network 208 to the host device 214a (e.g., via its supplier VTEP device 212a).

If, at decision block 406, it is determined that the second host address information is not stored in the database, the method 400 proceeds to block 410 where the distributor switch device floods an address discovery request to the network. As discussed above, in this alternate embodiment it is assumed that the host address information for the host device 214a was not transmitted to the distributor VTEP device 204b at block 402 and, at decision block 406 the address discovery engine 304 in the distributor VTEP device 204b/300 will determine that the IP address identified in the address discovery communication for the host device 214a is not included in its address discovery database 306 and associated with a MAC address for the host device 214a. In response, the address discovery engine 304 in the distributor VTEP device 204b/300 may perform address discovery flooding operations 1100 that includes broadcasting an address discovery request communication to each of the VTEP devices 204a, 212a, 212b, and 212c. As will be appreciated by one of skill in the art in possession of the present disclosure, the address discovery request communication broadcast to each of the VTEP devices 204a, 212a, 212b, and 212c may identify the IP address of the host device 214a, with the VTEP device 204a, 212a, 212b, and 212c configured to respond with its own address information and the MAC address and VNI of the host device 214a if it is known to that VTEP device (i.e., if the host device 214a is connected to that VTEP device), and ignore the address discovery request communication if the MAC address and VNI of the host device 214a is not known to that VTEP device (i.e., if the host device 214a is not connected to that VTEP device).

Figure 11A:
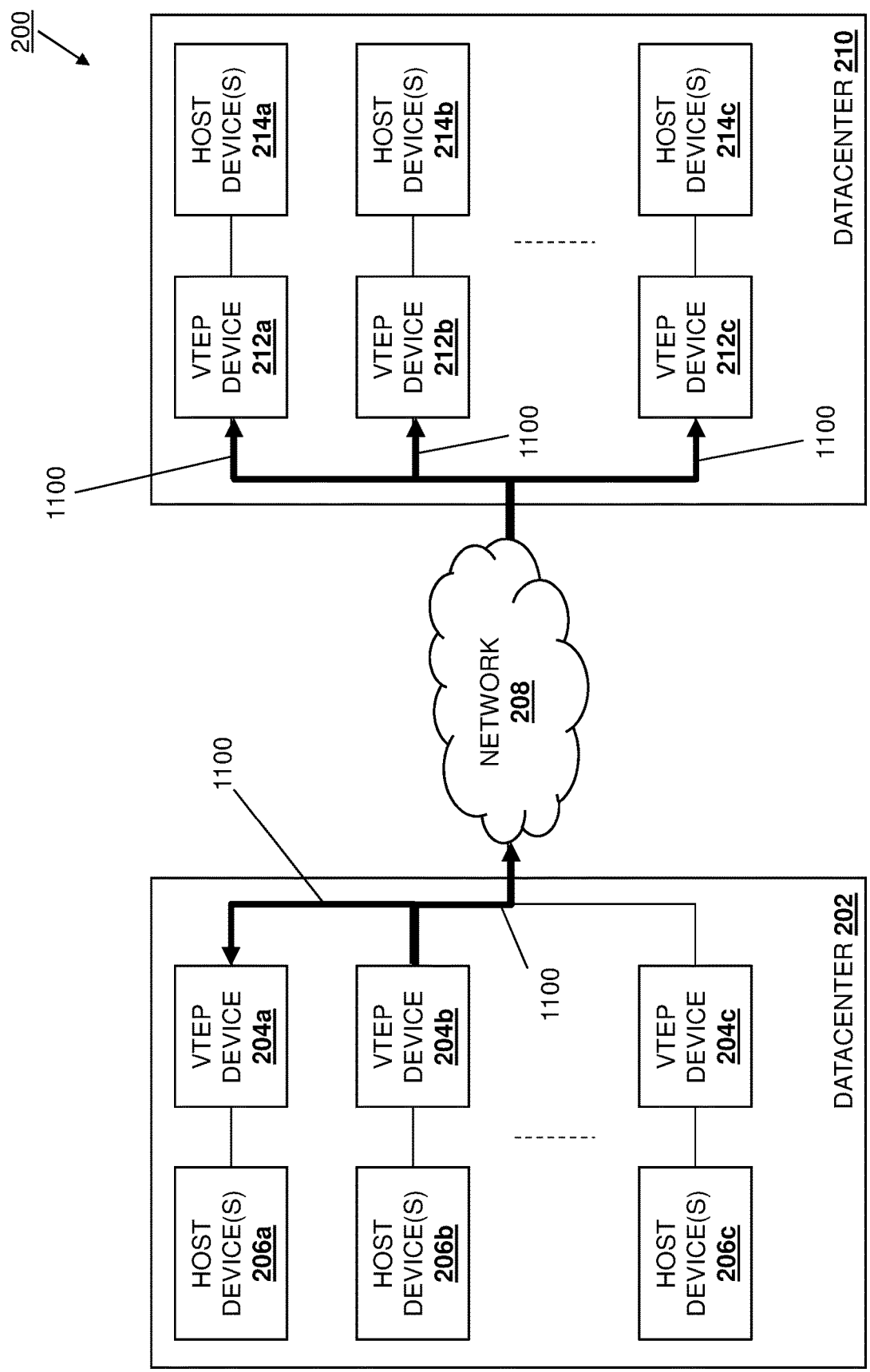
FIG. 11A is a schematic view illustrating an embodiment of the networked system of FIG. 2 operating during the method of FIG. 4.
Figure 11B:
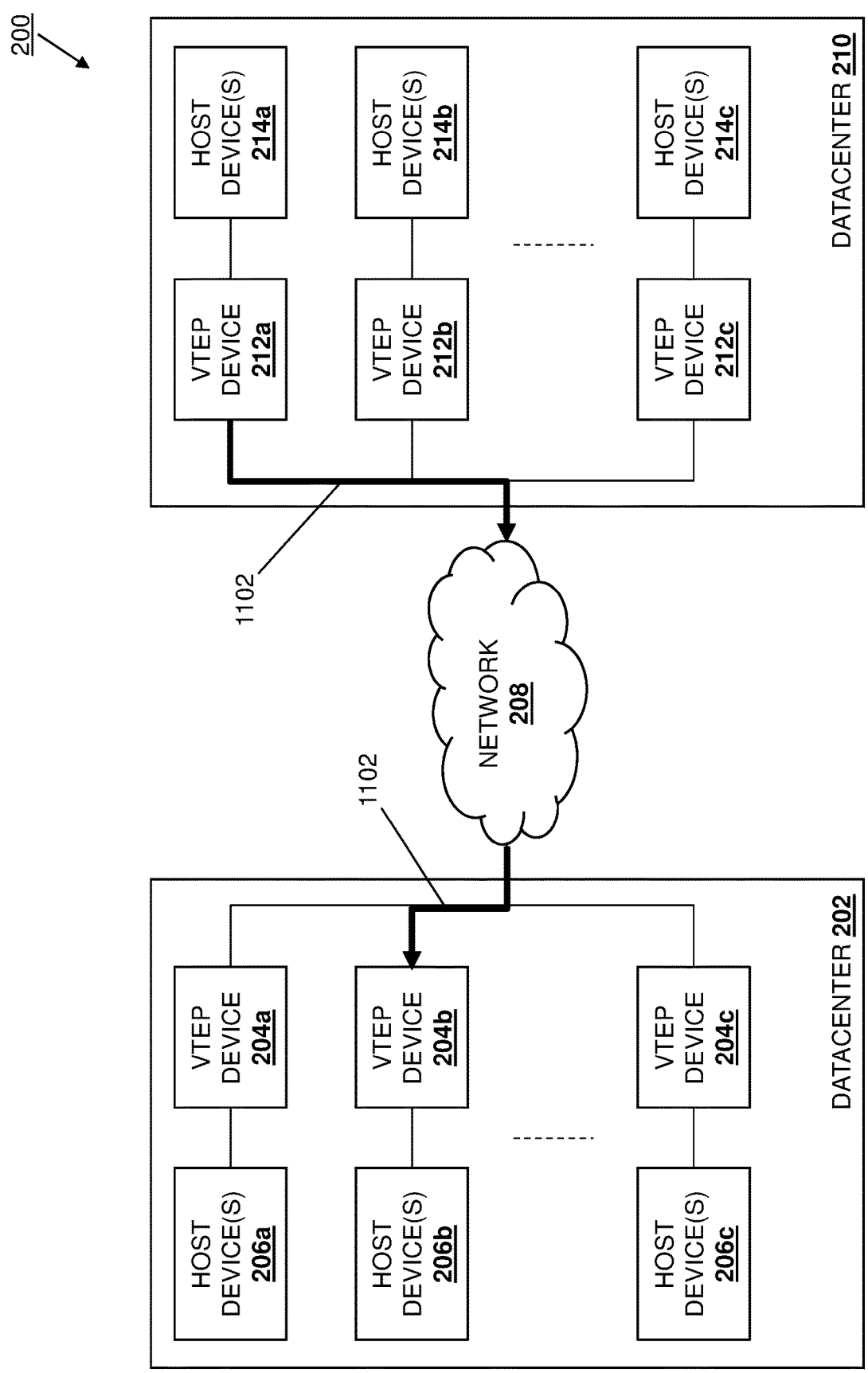
FIG. 11B is a schematic view illustrating an embodiment of the networked system of FIG. 2 operating during the method of FIG. 4.

The method 400 then proceeds to block 412 where the distributor switch devices receives the second host address information via the network from a switch device that is coupled to the second host device. As illustrated in FIG. 11B, in an embodiment of block 412 and in response to receiving the address discovery request communication broadcast by the distributor VTEP device 204b at block 410, the address discovery engine 304 in the VTEP device 212a may perform address discovery reply operations 1102 that may include generating an address discovery reply communication that identifies its address information and the MAC address and VNI for the host device 214a, and transmitting the address discovery reply communication through its communication system 308 and via the network 208 to the distributor VTEP device 204b. For example, the address discovery reply communication transmitted by the supplier VTEP device 212a at block 412 may include information similar to that described above with reference to FIG. 6A. As such, the address discovery engine 304 in the distributor VTEP device 204b may receive that address discovery reply communication via its communication system 308.

Figure 11C:
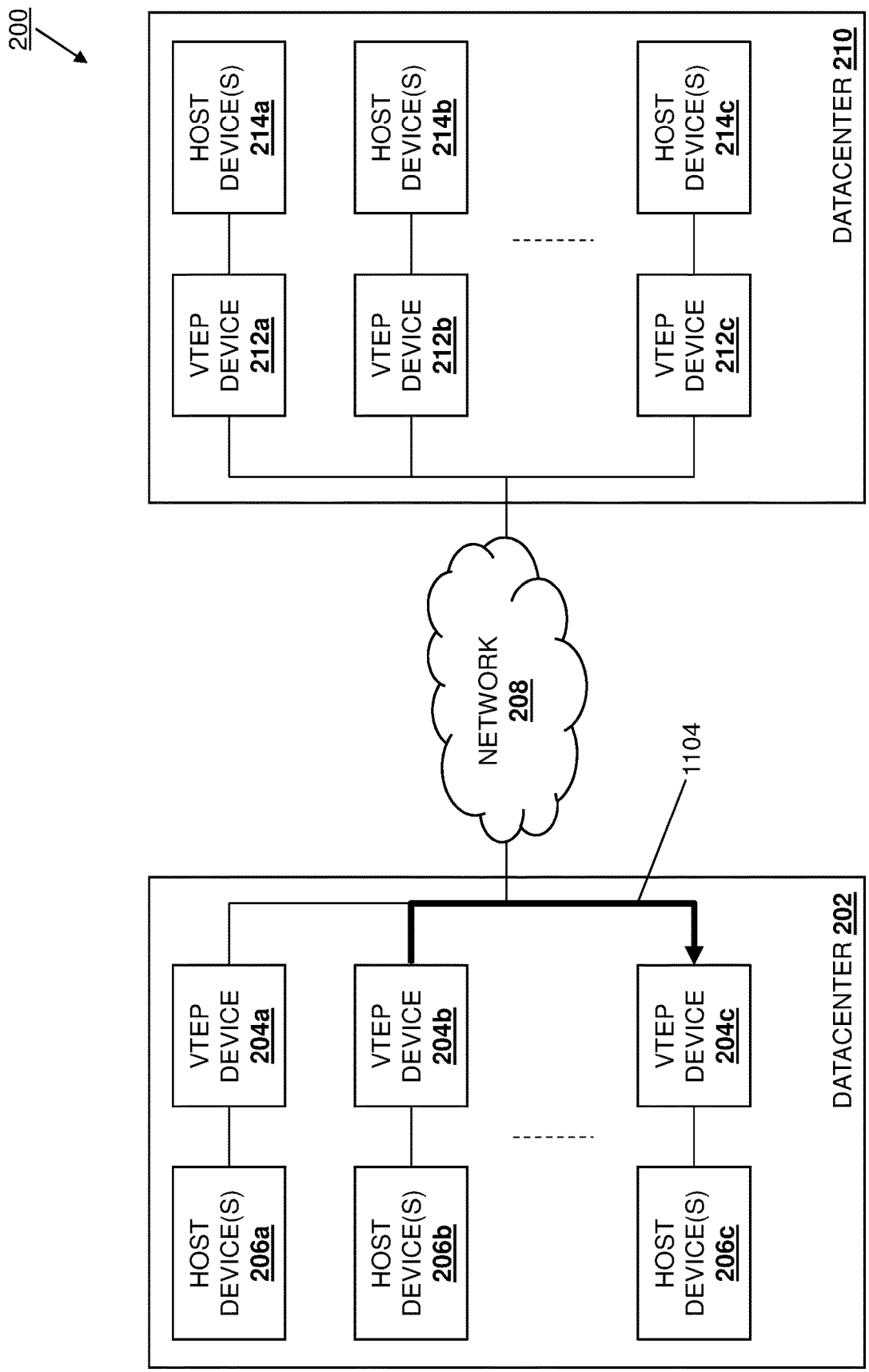
FIG. 11C is a schematic view illustrating an embodiment of the networked system of FIG. 2 operating during the method of FIG. 4.
Figure 11D:
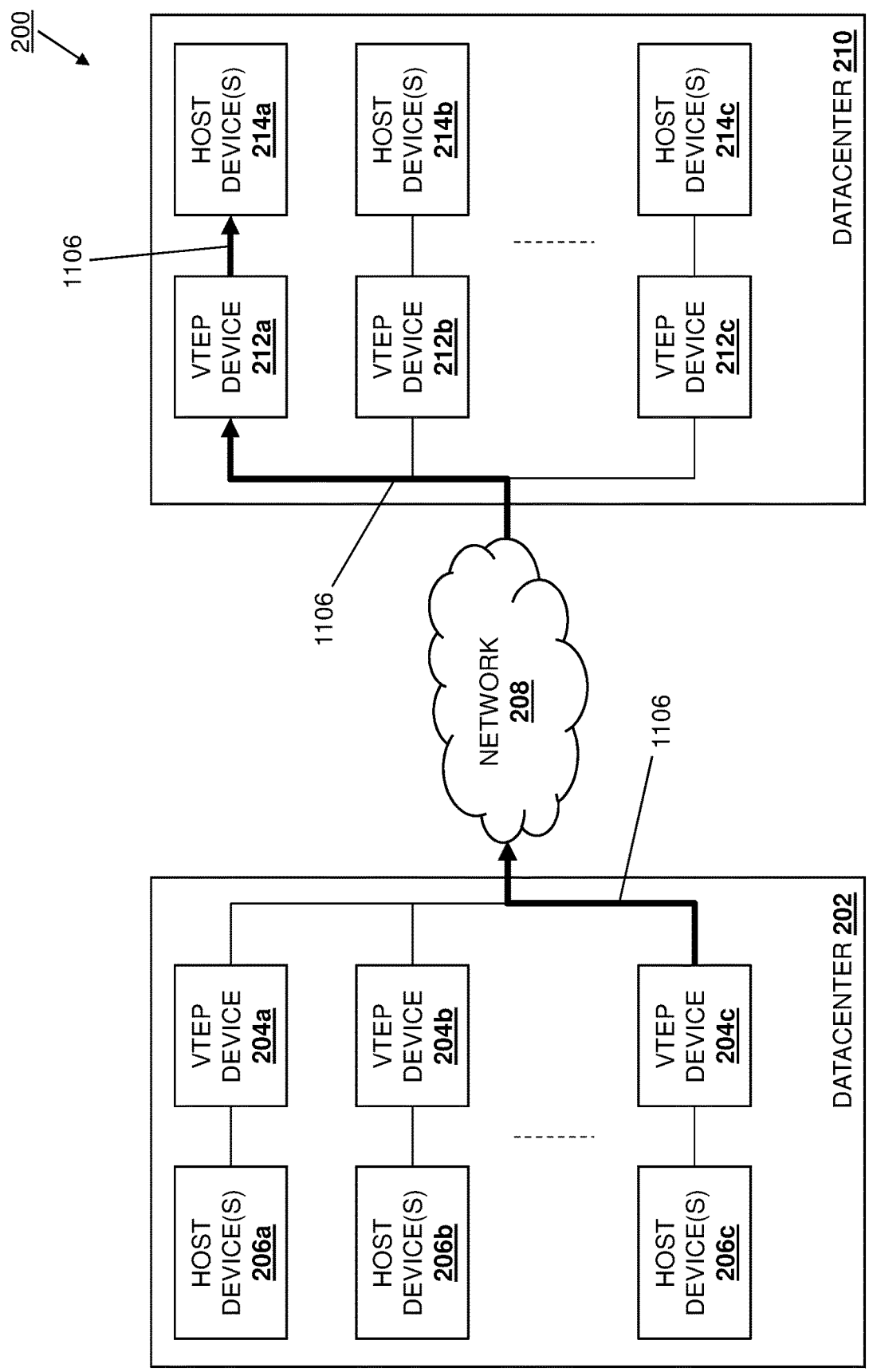
FIG. 11D is a schematic view illustrating an embodiment of the networked system of FIG. 2 operating during the method of FIG. 4.

In the method 400 then proceeds to block 414 where the distributor switch device transmits the second host address information via the network to the first supplier switch device. With reference to FIG. 11C, the address discovery engine 304 in the distributor VTEP device 204b/300 may then perform address discovery reply operations 1104 that include transmitting an address discovery reply communication (e.g., that is substantially similar to the address discovery reply communication discussed above that includes the UDP datagram 802) via its communication system 308 to the supplier VTEP device 204c such that the address discovery engine 304 in the supplier VTEP device 204c/300 receives that address discovery reply communication via its communication system 308. With reference to FIG. 11D, the address discovery engine 304 in the supplier VTEP device 204c/300 may then utilize the address information for the host device 214a and the supplier VTEP device 212a to perform host device communication operations 1000 that include transmitting the host device communication received from its connected host device 206c through its communication system 308 and via the network 208 and the supplier VTEP device 212a to the host device 214a. In some embodiments, the address discovery engine 304 in the supplier VTEP device 204c/300 may also store address information for the supplier VTEP device 212a and host device 214 in its address discovery database 308 for future use in transmitting host device communications to the host device 214*a*. As such, continuing with the specific example discussed above, the address discovery engine 304 in the supplier VTEP device 204*c*/300 may utilize the IP address, MAC address, and VNI received for the supplier VTEP device 212*a*, along with the IP address, MAC address, and VNI received for the host device 214*a*, to transmit the host device communication received from its connected host device 206*c* via the network 208 to the host device 214*a* (e.g., via its supplier VTEP device 212*a*).

While not described in detail above, the address discovery system of the present disclosure may also be compatible with conventional address discovery systems. For example, in the event the networked system 200 includes a VTEP device that is not configured to perform the address discovery functionality of the present disclosure, that VTEP device may still perform conventional address discovery operations that flood/broadcast an address discovery request (e.g., an ARP request) through the network to the VTEP devices 204*a*-204*c* and 212*a*-212*c* when its connected host device wishes to communicate with another host device in the networked system 200. However, that address discovery request will not identify that the address discovery system of the present disclosure is being utilized via bit 2 of the VxLAN data packet (e.g., bit 2 will not be set to "1", which will indicate to the VTEP devices 204*a*-204*c* and 212*a*-212*c* to use conventional address discovery techniques). In response to receiving such address discovery requests, the VTEP devices 204*a*-204*c* and 212*a*-212*c* will respond using conventional address discovery techniques, thus allowing conventional VTEP devices to be added to the networked system 200 without experiencing issues.

Thus, systems and methods have been described that provide a distributor VTEP device in a network that collects address discovery information from supplier VTEP devices for their connected host devices and stores it in a database, and when a first VTEP device in the network is connected to a first host device that wants to communicate with a second host device in the network, the distributor VTEP device finds the address discovery information for that second host device in its network, and provides it to the first VTEP device to enable that communication. For example, the address discovery system of the present disclosure may include supplier VTEP devices that are each coupled to host device(s), and a distributor VTEP device that is coupled to each of the supplier VTEP devices via a network. The distributor VTEP device receives, via the network from each of the supplier VTEP devices, host address information for each host device that is coupled to that supplier VTEP device, and stores that host address information in a database. Subsequently, when a first supplier VTEP device transmits a first address discovery request to the distributor VTEP device for second host address information for a second host device coupled to a second supplier VTEP device, the distributor VTEP device determines that the second host address information is included in the host address information stored in the database, retrieves the second host address information, and transmits the second host address information via the network to the first supplier VTEP device. As such, address discovery is enabled in the network without the bandwidth and configuration issues associated with multi-cast address discovery techniques, or the configuration issues associated with EVPN/BGP techniques Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An address discovery system, comprising:
a plurality of supplier switch devices that are each coupled to at least one host device; and
a distributor switch device that is coupled to each of the plurality of supplier switch devices via a network and that is configured to:
receive, via the network from each of the plurality of supplier switch devices, respective first Virtual extensible Local Area Network (VxLAN) data packets that each include:
a first bit of a flags section set to indicate that first VxLAN data packet is being provided for address discovery;
a second bit of the flags section set to indicate that first VxLAN data packet is providing host address information; and
host address information for each host device that is coupled to that supplier switch device;
store the host address information in a database;
receive, subsequent to storing the host address information in the database and via the network from a first supplier switch device that is included in the plurality of supplier switch devices, a second VxLAN data packet that includes:
the first bit of the flags section set to indicate that second VxLAN data packet is being provided for address discovery;
a third bit of the flags section set to indicate that second VxLAN data packet is providing an address discovery request; and
a second host device identifier for a second host device that is coupled to a second supplier switch device;
determine that second host address information is associated with the second host device identifier in the host address information stored in the database;
retrieve the second host address information from the database; and
transmit, via the network to the first supplier switch device, a third VxLAN data packet that includes:
the first bit of the flags section set to indicate that third VxLAN data packet is being provided for address discovery;
a fourth bit of the flags section set to indicate that second VxLAN data packet is providing an address discovery reply; and
the second host address information.

2. The system of claim 1, wherein the distributor switch device and each of the plurality of supplier switch devices are provided by a respective Virtual extensible Local Area Network (VxLAN) Tunnel EndPoint (VTEP) device.

3. The system of claim 1, wherein the host address information is received from each of the plurality of supplier switch devices in a respective Address Resolution Protocol (ARP) table.

4. The system of claim 1, wherein the distributor switch device and each of the plurality of supplier switch devices share a common Virtual Network Interface (VNI).

5. The system of claim 1, wherein the second host device identifier is provided by a Internet Protocol (IP) address, and wherein the second host address information is provided by a Media Access Control (MAC) address.

6. The system of claim 1, wherein the distributor switch device is configured to:
receive, subsequent to storing the host address information in the database and from a third supplier switch device that is included in the plurality of supplier switch devices, a fourth VxLAN data packet that includes:
the first bit of the flags section set to indicate that fourth VxLAN data packet is being provided for address discovery;
the third bit of the flags section set to indicate that fourth VxLAN data packet is providing an address discovery request; and
a third host device identifier for a third host device;
determine that third host address information is not associated with the third host device identifier in the host address information stored in the database;
flood, via the network, a broadcast address discovery request that is associated with the third host address information;
receive, via the network in response to flooding the broadcast address discovery request via the network, the third host address information; and
transmit, to the second supplier switch device, a fifth VxLAN data packet that includes:
the first bit of the flags section set to indicate that fifth VxLAN data packet is being provided for address discovery;
the fourth bit of the flags section set to indicate that fifth VxLAN data packet is providing an address discovery reply; and
the third host address information.

7. An Information Handling System (IHS), comprising:
a processing system; and
a memory system that is coupled to the processing system and that includes instructions that, when executed by the processing system, cause the processing system to provide an address discovery engine that is configured to:
receive, via a network from each of a plurality of switch devices, respective first Virtual extensible Local Area Network (VxLAN) data packets that each include:
a first bit of a flags section set to indicate that first VxLAN data packet is being provided for address discovery;
a second bit of the flags section set to indicate that first VxLAN data packet is providing host address information; and
host address information for each host device that is coupled to that switch device;
store the host address information in a database;
receive, subsequent to storing the host address information in the database and via the network from a first switch device that is included in the plurality of switch devices, a second VxLAN data packet that includes:
the first bit of the flags section set to indicate that second VxLAN data packet is being provided for address discovery;
a third bit of the flags section set to indicate that second VxLAN data packet is providing an address discovery request; and
a second host device identifier for a second host device that is coupled to a second switch device;
determine that second host address information is associated with the second host device identifier in the host address information stored in the database;
retrieve the second host address information from the database; and
transmit, via the network to the first switch device, a third VxLAN data packet that includes:
the first bit of the flags section set to indicate that third VxLAN data packet is being provided for address discovery;
a fourth bit of the flags section set to indicate that second VxLAN data packet is providing an address discovery reply; and
the second host address information.

8. The IHS of claim 7, wherein each of the plurality of switch devices are provided by a respective Virtual extensible Local Area Network (VxLAN) Tunnel EndPoint (VTEP) device, and wherein the address discovery engine is included in a VTEP device.

9. The IHS of claim 7, wherein the host address information is received from each of the plurality of switch devices in a respective Address Resolution Protocol (ARP) table.

10. The IHS of claim 7, wherein the address discovery engine and each of the plurality of switch devices share a common Virtual Network Interface (VNI).

11. The IHS of claim 7, wherein the second host device identifier is provided by a second host device Internet Protocol (IP) address of the second host device, and wherein the second host address information is provided by a Media Access Control (MAC) address of the second host device.

12. The IHS of claim 11, wherein the second VxLAN data packet includes a first switch device Internet Protocol (IP) address of the first switch device, a first switch device Media Access Control (MAC) address of the first switch device, the second host device IP address of the second host device, and does not include a valid MAC address in a MAC address section of the second VxLAN data packet.

13. The IHS of claim 7, wherein the address discovery engine is configured to:
receive, subsequent to storing the host address information in the database and from a second switch device that is included in the plurality of switch devices, a fourth VxLAN data packet that includes:
the first bit of the flags section set to indicate that fourth VxLAN data packet is being provided for address discovery;
the third bit of the flags section set to indicate that fourth VxLAN data packet is providing an address discovery request; and
a third host device identifier for a third host device;
determine that third host address information is not associated with the third host device identifier in the host address information stored in the database;
flood, via the network, a broadcast address discovery request that is associated with the third host address information;
receive, via the network in response to flooding the broadcast address discovery request via the network, the third host address information; and
transmit, to the second switch device, a fifth VxLAN data packet that includes:
the first bit of the flags section set to indicate that fifth VxLAN data packet is being provided for address discovery;

the fourth bit of the flags section set to indicate that fifth VxLAN data packet is providing an address discovery reply; and the third host address information.

14. A method for discovering addresses, comprising:

receiving, by a distributor switch device via a network from each of a plurality of supplier switch devices, respective first Virtual extensible Local Area Network (VxLAN) data packets that each include:
- a first bit of a flags section set to indicate that first VxLAN data packet is being provided for address discovery;
- a second bit of the flags section set to indicate that first VxLAN data packet is providing host address information; and
- host address information for each host device that is coupled to that supplier switch device;

storing, by the distributor switch device, the host address information in a database;

receiving, by the distributor switch device subsequent to storing the host address information in the database and via the network from a first supplier switch device that is included in the plurality of supplier switch devices, a second VxLAN data packet that includes:
- the first bit of the flags section set to indicate that second VxLAN data packet is being provided for address discovery;
- a third bit of the flags section set to indicate that second VxLAN data packet is providing an address discovery request; and
- a second host device identifier for a second host device that is coupled to a second supplier switch device;

determining that second host address information is associated with the second host device identifier in the host address information stored in the database;

retrieving the second host address information from the database; and transmitting, via the network to the first supplier switch device, a third VxLAN data packet that includes:
- the first bit of the flags section set to indicate that third VxLAN data packet is being provided for address discovery;
- a fourth bit of the flags section set to indicate that second VxLAN data packet is providing an address discovery reply; and
- the second host address information.

15. The method of claim 14, wherein the distributor switch device and each of the plurality of supplier switch devices are provided by a respective Virtual extensible Local Area Network (VxLAN) Tunnel EndPoint (VTEP) device.

16. The method of claim 14, wherein the host address information is received from each of the plurality of supplier switch devices in a respective Address Resolution Protocol (ARP) table.

17. The method of claim 14, wherein the distributor switch device and each of the plurality of supplier switch devices share a common Virtual Network Interface (VNI).

18. The method of claim 14, wherein the second host device identifier is provided by a second host Internet Protocol (IP) address of the second host device, and wherein the second host address information is provided by a Media Access Control (MAC) address of the second host device.

19. The method of claim 18, wherein the second VxLAN data packet includes a first supplier switch device Internet Protocol (IP) address of the first supplier switch device, a first supplier switch device Media Access Control (MAC) address of the first supplier switch device, the second host device IP address of the second host device, and does not include a valid MAC address of the second VxLAN data packet.

20. The method of claim 14, further comprising:

receiving, by the distributor switch device subsequent to storing the host address information in the database and from a second supplier switch device that is included in the plurality of supplier switch devices, a fourth VxLAN data packet that includes:
- the first bit of the flags section set to indicate that fourth VxLAN data packet is being provided for address discovery;
- the third bit of the flags section set to indicate that fourth VxLAN data packet is providing an address discovery request; and
- a third host device identifier for a third host device;

determining, by the distributor switch device, that third host address information is not associated with the third host device identifier in the host address information stored in the database;

flooding, by the distributor switch device via the network, a broadcast address discovery request that is associated with the third host address information;

receiving, by the distributor switch device via the network in response to flooding the third address discovery request via the network, the third host address information; and transmitting, to the second supplier switch device, a fifth VxLAN data packet that includes:
- the first bit of the flags section set to indicate that fifth VxLAN data packet is being provided for address discovery;
- the fourth bit of the flags section set to indicate that fifth VxLAN data packet is providing an address discovery reply; and
- the third host address information.

\* \* \* \* \*